United States Patent
Karimoto et al.

(10) Patent No.: US 8,467,581 B2
(45) Date of Patent: Jun. 18, 2013

(54) IMAGE CAPTURING APPARATUS, IMAGE CAPTURING METHOD, AND COMPUTER PROGRAM

(75) Inventors: Takashi Karimoto, Kanagawa (JP); Takuma Morita, Tokyo (JP); Kazutaka Urabe, Tokyo (JP); Kana Maruyama, Tokyo (JP)

(73) Assignee: Sony Corporation, Tokyo (JP)

( * ) Notice: Subject to any disclaimer, the term of this patent is extended or adjusted under 35 U.S.C. 154(b) by 1085 days.

(21) Appl. No.: 12/432,160

(22) Filed: Apr. 29, 2009

(65) Prior Publication Data

US 2009/0304289 A1  Dec. 10, 2009

(30) Foreign Application Priority Data

Jun. 6, 2008 (JP) .................................. 2008-148841

(51) Int. Cl.
*G06K 9/00* (2006.01)
(52) U.S. Cl.
USPC ........................................................ 382/118
(58) Field of Classification Search
USPC ................... 382/190, 118, 117; 348/207, 208
See application file for complete search history.

(56) References Cited

U.S. PATENT DOCUMENTS

| | | | |
|---|---|---|---|
| 6,483,993 B1 * | 11/2002 | Misumi et al. .................... | 396/78 |
| 6,940,545 B1 * | 9/2005 | Ray et al. ..................... | 348/222.1 |
| 6,996,340 B2 | 2/2006 | Yamaguchi et al. | |
| 7,120,278 B2 * | 10/2006 | Sukegawa et al. ............. | 382/118 |
| 7,158,657 B2 * | 1/2007 | Okazaki et al. ................ | 382/118 |
| 7,248,300 B1 | 7/2007 | Ono | |
| 7,430,369 B2 * | 9/2008 | Fukui ............................... | 396/78 |
| 7,593,633 B2 * | 9/2009 | Okamoto ....................... | 396/222 |
| 7,616,233 B2 * | 11/2009 | Steinberg et al. ........... | 348/222.1 |
| 7,764,828 B2 * | 7/2010 | Sasaki et al. .................. | 382/154 |
| 7,844,076 B2 * | 11/2010 | Corcoran et al. ............. | 382/103 |
| 2004/0170397 A1 | 9/2004 | Ono | |
| 2006/0187305 A1 * | 8/2006 | Trivedi et al. ................. | 348/169 |
| 2007/0195171 A1 | 8/2007 | Xiao et al. | |

(Continued)

FOREIGN PATENT DOCUMENTS

| | | |
|---|---|---|
| CN | 101212572 A | 7/2008 |
| JP | 2000-347278 | 12/2000 |

(Continued)

OTHER PUBLICATIONS

Office Action issued Sep. 14, 2010, in China Patent Application No. 200910141556.1 (with English-language Translation).

(Continued)

*Primary Examiner* — Vu Le
*Assistant Examiner* — Aklilu Woldemariam
(74) *Attorney, Agent, or Firm* — Oblon, Spivak, McClelland, Maier & Neustadt, L.L.P.

(57) ABSTRACT

An image capturing apparatus includes an image pickup unit configured to obtain an image; a face detecting unit configured to detect a face of a photographic subject included in the image; an attribute detecting unit configured to detect attribute information of the face; an evaluation unit configured to evaluate a degree of intimacy between a plurality of photographic subjects based on a plurality of items of attribute information detected by the attribute detecting unit from faces of the plurality of photographic subjects, the faces being detected by the face detecting unit; and a control unit configured to cause the image pickup unit to capture an image of the plurality of photographic subjects based on an evaluation result obtained by the evaluation unit.

19 Claims, 15 Drawing Sheets

U.S. PATENT DOCUMENTS

2008/0111889 A1* 5/2008 Fujita et al. ................ 348/208.5
2008/0159628 A1   7/2008 Yoshida
2008/0240563 A1* 10/2008 Takano et al. ................ 382/173

FOREIGN PATENT DOCUMENTS

| JP | 2003-271933 | 9/2003 |
|----|-------------|--------|
| JP | 2004-127285 | 4/2004 |
| JP | 2004-294498 | 10/2004 |
| JP | 2006-74368  | 3/2006 |
| JP | 2006-237803 | 9/2006 |
| JP | 2006-345254 | 12/2006 |
| JP | 2007-41964  | 2/2007 |
| JP | 2007-201980 | 8/2007 |
| JP | 2008-42319  | 2/2008 |
| JP | 2008-167063 | 7/2008 |
| JP | 2009-100284 | 5/2009 |
| JP | 2009-231956 | 10/2009 |

OTHER PUBLICATIONS

Office Action mailed Oct. 2, 2012, in Japanese Patent Application No. 2009-16866.

* cited by examiner $P_{pos\_1\_1}$ (x, y)　　$P_{pos\_1\_2}$ (x, y)　　$P_{pos\_1\_3}$ (x, y)

$P_{pos\_2\_2}$ (x, y)　　$P_{pos\_2\_3}$ (x, y)
$P_{pos\_2\_1}$ (x, y)　　$P_{pos\_2\_4}$ (x, y)

$P_{angle\_1\_1}$ (roll, yaw, pitch)　　$P_{angle\_1\_2}$ (roll, yaw, pitch)

$P_{angle\_2\_1}$ (roll, yaw, pitch)　　$P_{angle\_2\_2}$ (roll, yaw, pitch)　　$P_{angle\_2\_3}$ (roll, yaw, pitch)

IMAGE CAPTURING APPARATUS, IMAGE CAPTURING METHOD, AND COMPUTER PROGRAM

BACKGROUND OF THE INVENTION

1. Field of the Invention

The present invention relates to an image capturing apparatus, an image capturing method, and a computer program for capturing an image including a photographic subject, such as a person, and more particularly, to an image capturing apparatus, an image capturing method, and a computer program for performing image capturing control in accordance with recognition of a specific pattern in a photographic subject included in an image.

More specifically, the present invention relates to an image capturing apparatus, an image capturing method, and a computer program for performing image capturing control on a captured image including multiple persons, and more particularly, to an image capturing apparatus, an image capturing method, and a computer program for performing image capturing control on the basis of the correlation between results of recognition of faces of multiple persons.

2. Description of the Related Art

In recent years, in place of silver salt cameras that capture images using films or sensitive plates, digital cameras that capture images using a solid-state image pickup device in which a light receiving section with an array of pixels performing photo-electric conversion and accumulation is implemented by a photodiode, perform digital coding processing on the captured images, and saves the processed images have been widely spread. As a solid-state image pickup device, for example, a charge-coupled device (CCD) or a complementary metal-oxide semiconductor (CMOS) device can be employed. For example, a CMOS sensor has advantages over a CCD sensor in that the CMOS sensor has small power consumption, the CMOS sensor is driven using a single low voltage, and the CMOS sensor is easily integrated with peripheral circuits.

The basic camera work of silver salt cameras is substantially the same as that of digital cameras. Combined with digitization of a captured image, automation has been extended to the camera work. Therefore, even an inexperienced user who is not good at operating a camera is significantly less likely to fail in capturing an image.

A major image capturing control function generally performs processing in accordance with at least one photographic subject existing in an image frame. In the past, a user manually entered settings relating to specify an important photographic subject. In recent years, an image capturing technique that employs face detection, such as detecting a face in a captured image, and automatically adjusting the focus to the detected face or automatically correcting image quality in accordance with the detected face, has been introduced. As a method of detecting a face in a captured image, for example, a method of matching an input image signal with an averaged face image serving as a template has been widely used (for example, see Japanese Unexamined Patent Application Publication No. 2003-271933 (paragraphs 0051 to 0053, FIG. 9)).

Recently, research and development of automatic image capturing in which an image capturing timing is determined using detection of a specific pattern, such as a smiling face, in an image of a photographic subject has been carried out. For example, a camera that determines whether, in a part of interest included in a main photographic subject of an image to be captured, the main photographic subject satisfies a predetermined image capturing condition and, if the predetermined image capturing condition is satisfied, outputs an image capturing timing signal has been proposed (for example, see Japanese Unexamined Patent Application Publication Nos. 2000-347278, 2004-294498, and 2006-237803). Specific criteria for determining an image capturing timing include, for example, "no blinking", "eyes are looking toward the camera", and "smiling", which are conditions for capturing an attractive image of a person. Photograph retouching has been done for a long time. It is difficult to retouch a photograph of a person who is blinking to make it look as if the person is not blinking, or to retouch a photograph of a person who is not smiling to make it look as if the person is smiling. These difficulties are one of the reasons why these conditions are used as criteria for determining an image capturing timing. For example, whether a photographic subject satisfies the photographic condition "smiling" can be determined on the basis of image information indicating, for example, the area of a white portion of the eyes, the horizontal length of the mouth, and the area of a white portion in the mouth of the photographic subject.

An image capturing control method of, when two or more photographic subjects are included in a captured image, performing image capturing control by performing focusing or image quality correction on the basis of a specific photographic subject determined to be a "main character" has been conceived. Intuitively, a photographic subject positioned near the center of the captured image or a photographic subject occupying a large portion of the captured image is more significant and can be estimated as a main character. For example, a face-significance determining apparatus that more accurately determines significance for a photographer by obtaining size information and position information of a face detected in an image signal, computing a first significance factor on the basis of the size information, computing a second significance factor on the basis of the position information, and computing the final degree of significance on the basis of the first and second significance factors has been proposed (for example, see Japanese Unexamined Patent Application Publication No. 2007-201980).

Also, an image capturing control method of, when two or more photographic subjects are included in a captured image, performing image capturing control based on the correlation between the photographic subjects is conceived. An image capturing apparatus that recognizes, for example, the faces of multiple photographic subjects, organizes the photographic subjects into groups on the basis of image capturing parameters, such as the distance between the faces of the photographic subjects and the luminance of the photographic subjects, and sets optimal image capturing parameters for the individual groups, thereby capturing an image using the optimal image capturing parameters for the individual photographic subjects has been proposed (for example, see Japanese Unexamined Patent Application Publication No. 2006-345254).

SUMMARY OF THE INVENTION

It is desirable to provide an image capturing apparatus, an image capturing method, and a computer program that can suitably perform image capturing control in accordance with recognition of a specific pattern in a photographic subject, such as a person, included in an image.

It is also desirable to provide an image capturing apparatus, an image capturing method, and a computer program that can suitably perform image capturing control on a captured image including multiple persons.

It is further desirable to provide an image capturing apparatus, an image capturing method, and a computer program that can suitably perform image capturing control on the basis of the correlation between results of recognition of faces of multiple persons.

According to an embodiment of the present invention, there is provided an image capturing apparatus including the following elements: an image pickup unit configured to obtain an image; a face detecting unit configured to detect a face of a photographic subject included in the image; an attribute detecting unit configured to detect attribute information of the face; an evaluation unit configured to evaluate a degree of intimacy between a plurality of photographic subjects based on a plurality of items of attribute information detected by the attribute detecting unit from faces of the plurality of photographic subjects, the faces being detected by the face detecting unit; and a control unit configured to cause the image pickup unit to capture an image of the plurality of photographic subjects based on an evaluation result obtained by the evaluation unit.

The image capturing apparatus may further include a computing unit configured to compute velocities at which positions of the faces of the plurality of photographic subjects change with time or angular velocities at which angles of the faces of the plurality of photographic subjects change with time. The evaluation unit may evaluate the degree of intimacy based on the velocities or the angular velocities.

The evaluation unit may evaluate the degree of intimacy based on degrees of smiling of the faces of the plurality of photographic subjects.

The evaluation unit may evaluate the degree of intimacy based on a distance between the faces of the plurality of photographic subjects and a difference between inclinations of the faces of the plurality of photographic subjects.

The control unit may perform control on an animated cartoon to be displayed on a display unit, on the basis of the evaluation result obtained by the evaluation unit.

The evaluation unit may evaluate the degree of intimacy based on a distance between the faces of the plurality of photographic subjects and degrees of smiling of the faces.

The control unit may display, on the display unit, an animated cartoon for assisting the plurality of photographic subjects in performing an operation to shorten the distance between the plurality of photographic subjects or to enhance degrees of smiling, in a case where the evaluation result obtained by the evaluation unit does not reach a predetermined state.

The control unit may display, on the display unit, an animated cartoon that visually represents the evaluation result obtained by the evaluation unit, in a case where the evaluation result obtained by the evaluation unit reaches a predetermined state and the image pickup unit is controlled by the control unit to capture an image of the plurality of photographic subjects.

The image capturing apparatus may further include a human-relationship determining unit configured to determine a human relationship between the plurality of photographic subjects by performing statistical processing on the evaluation result obtained by the evaluation unit in a predetermined degree-of-intimacy determining period.

The control unit may add a decoration to the image obtained by the image pickup unit, on the basis of the human relationship between the plurality of photographic subjects, which is determined by the human-relationship determining unit.

The image capturing apparatus may further include a recording unit configured to record the human relationship between the plurality of photographic subjects, which is determined by the human-relationship determining unit, as information to be added to the captured image.

According to another embodiment of the present invention, there is provided an image capturing method including the steps of: causing an image pickup unit to obtain an image; detecting a face of a photographic subject included in the image; detecting attribute information of the face; evaluating a degree of intimacy between a plurality of photographic subjects based on a plurality of items of attribute information detected from detected faces of the plurality of photographic subjects; and performing control to cause the image pickup unit to capture an image of the plurality of photographic subjects based on an evaluation result obtained in the step of evaluating.

According to another embodiment of the present invention, there is provided a computer-readable recording medium having a program recorded thereon, the program causing a computer to execute a process including the steps of: causing an image pickup unit to obtain an image; detecting a face of a photographic subject included in the image; detecting attribute information of the face; evaluating a degree of intimacy between a plurality of photographic subjects based on a plurality of items of attribute information detected from detected faces of the plurality of photographic subjects; and performing control to cause the image pickup unit to capture an image of the plurality of photographic subjects based on an evaluation result obtained in the step of evaluating.

According to another embodiment of the present invention, there is provided an image capturing apparatus including the following elements: an image pickup unit configured to obtain an image; a face detecting unit configured to detect a face of a photographic subject included in the image; an evaluation unit configured to evaluate a correlation between positions or angles of faces of a plurality of photographic subjects, the faces being detected by the face detecting unit; and a control unit configured to cause the image pickup unit to capture an image of the plurality of photographic subjects based on an evaluation result obtained by the evaluation unit.

The evaluation unit may evaluate the correlation, which is defined by the positions or the angles of the faces, by comparing the correlation with predetermined positions or angles.

The predetermined positions or angles may be positions or angles at which two or more detected faces are at the same height or three or more detected faces are substantially aligned on a straight line.

The predetermined positions or angles may be positions or angles of a polygon having positions of three or more detected faces of photographic subjects as vertices.

The predetermined positions or angles may be positions or angles at which two detected faces face inward or multiple detected faces face a certain direction.

According to another embodiment of the present invention, there is provided an image capturing method including the steps of: causing an image pickup unit to obtain an image; detecting a face of a photographic subject included in the image; evaluating a correlation between positions or angles of detected faces of a plurality of photographic subjects; and performing control to cause the image pickup unit to capture an image of the plurality of photographic subjects based on an evaluation result obtained in the step of evaluating.

According to another embodiment of the present invention, there is provided a computer-readable recording medium having a program recorded thereon, the program causing a computer to execute a process including the steps of: causing an image pickup unit to obtain an image; detecting a face of a photographic subject included in the image; evaluating a correlation between positions or angles of detected faces of a plurality of photographic subjects; and performing control to cause the image pickup unit to capture an image of the plurality of photographic subjects based on an evaluation result obtained in the step of evaluating.

According to an embodiment of the present invention, an image capturing apparatus, an image capturing method, and a computer program that can suitably perform image capturing control in accordance with recognition of a specific pattern in a photographic subject, such as a person, included in an image can be provided.

According to an embodiment of the present invention, an image capturing apparatus, an image capturing method, and a computer program that can suitably perform image capturing control on a captured image including multiple persons can be provided.

When an image capturing apparatus according to an embodiment of the present invention captures an image including multiple photographic subjects, the image capturing apparatus detects a plurality of face recognition parameters, such as the degree of smiling, the position in an image frame, the inclination of the detected face, and an attribute such as sex of each photographic subject, from the individual photographic subjects, and, on the basis of the correlation among the detected face recognition parameters, suitably performs image capturing control such as determining of a shutter timing and setting of a self timer.

Further features and advantages of the present invention will become apparent from the following description of exemplary embodiments with reference to the attached drawings.

DESCRIPTION OF THE PREFERRED EMBODIMENTS

Hereinafter, embodiments of the present invention will be described in detail with reference to the drawings.

Figure 1:
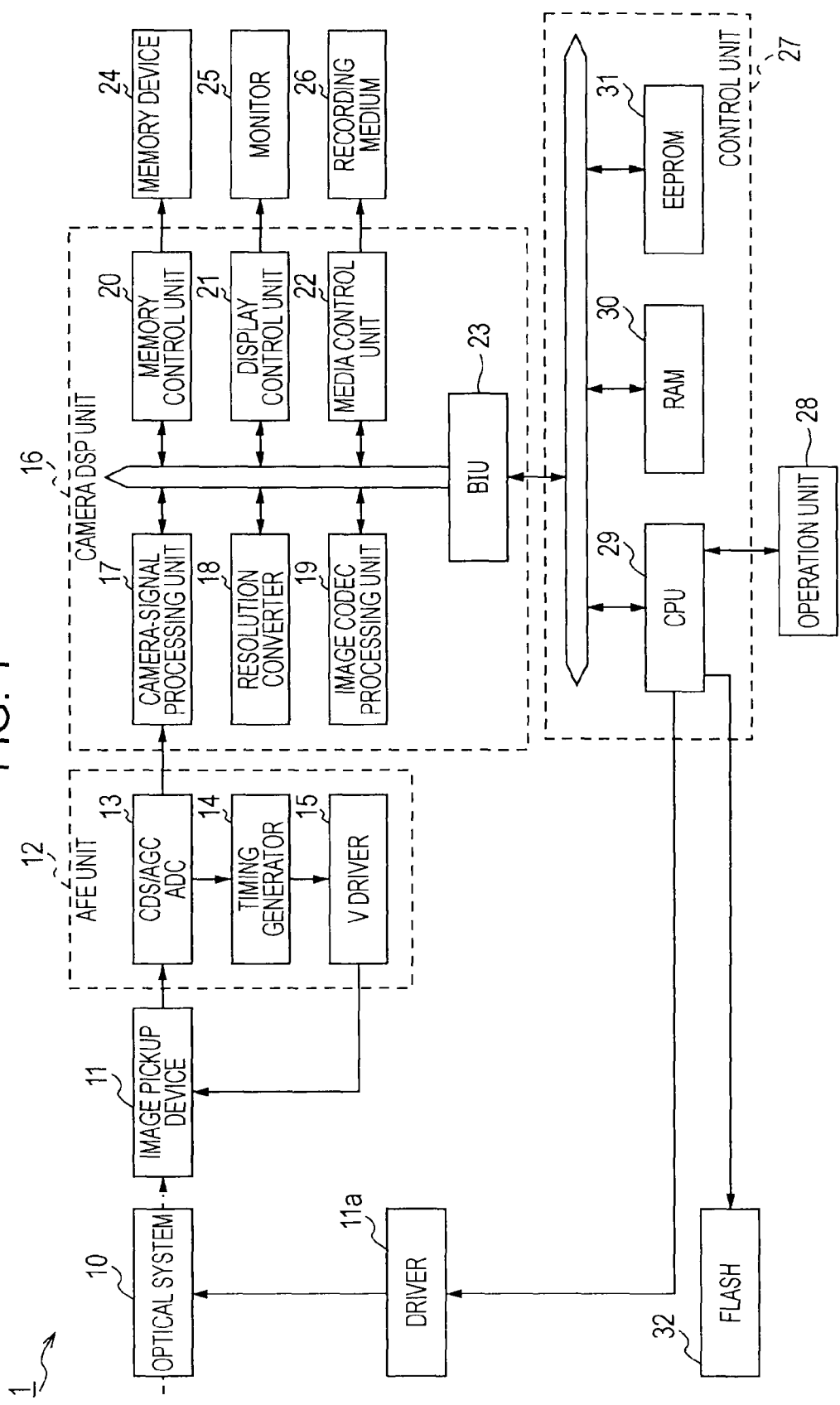
FIG. 1 is a schematic diagram illustrating a hardware structure of a digital still camera according to an embodiment of the present invention.

FIG. 1 schematically illustrates a hardware structure of a digital still camera 1 according to an embodiment of the present invention. The digital still camera 1 illustrated in FIG. 1 includes an image pickup device 11, an analog front end (AFE) unit 12, and a camera digital signal processing (DSP) unit 16. The digital still camera 1 performs digital processing of an image input via an optical system 10 and records the processed image.

The optical system 10 includes a lens for collecting light reflected from a photographic subject onto an image pickup face of the image pickup device 11, a drive mechanism for performing focusing and zooming by moving the lens, a shutter mechanism for allowing light reflected from the photographic subject to be incident on the image pickup device 11 for a predetermined time by performing an open/close operation, and an iris mechanism for limiting the direction and the range of light beams reflected from the photographic subject. The lens, the drive mechanism, the shutter mechanism, and the iris mechanism are not illustrated in the drawings. A driver 10a controls driving of each mechanism in the optical system 10 on the basis of a control signal from a central processing unit (CPU) 29, which will be described later. That is, the driver 10a controls, for example, focusing on a photographic subject, the iris, the timing of the shutter, or setting of a self timer.

The image pickup device 11 is implemented by, for example, a CCD or a CMOS device. The image pickup device 11 has the image pickup face on which pixels having a photoelectric conversion effect are arranged two-dimensionally. The image pickup device 11 converts incident light reflected from a photographic subject into an electric signal. For example, a green (G)-checkered red/blue (RB)-color coding single plate is arranged on a light receiving side of the image pickup device 11. Signal electric charge corresponding to the amount of incident light passed through each color filter is stored in each pixel, and the color of the incident light at the pixel position can be reproduced on the basis of the amounts of signal electric charge of three colors, which are read from the pixel. An analog image signal output from the image pickup device 11 is a primary color signal of R, G, and B colors. However, this analog image signal may be a complementary color signal.

The AFE unit 12 includes a correlated double sampling (CDS)/automatic gain control (AGC)/analog-to-digital conversion (ADC) block 13, a timing generator 14, and a V driver 15 and is implemented as, for example, a single integrated circuit (IC) chip.

The CDS/AGC/ADC block 13 highly accurately suppresses signal low noise in a pixel signal received from the image pickup device 11, performs correlated double sampling (CDS), sampling-and-holding, automatic gain control (AGC) for applying appropriate gain control, and analog-to-digital conversion (ADC), thereby outputting a digital image signal.

The timing generator 14 generates a timing pulse signal for driving the image pickup device 11. The V driver 15 outputs a driving signal in accordance with the timing pulse signal so that the electric charge of each pixel in the image pickup device 11 can be output on a line-by-line basis in the vertical direction.

The camera DSP unit 16 includes a camera-signal processing unit 17, a resolution converter 18, an image codec processing unit 19, a memory control unit 20, a display control unit 21, and a media control unit 22 and is implemented as, for example, a single IC chip.

The camera-signal processing unit 17 applies pre-processing, such as defective pixel correction, digital clamping, and digital gain control, to an image signal sent from the AFE unit 12. Then, the camera-signal processing unit 17 applies white balance gain control using automatic white balance (AWB) and applies image quality correction, such as sharpness/saturation contrast adjustment, flash control, and red-eye reduction, to the image signal, thereby reproducing an appropriate color state. The camera-signal processing unit 17 further performs demosaicing to generate an RGB image signal. By applying gamma (γ) correction to the RGB image signal, the camera-signal processing unit 17 can convert the RGB image signal into a grayscale signal suitable for the image information to be output from a monitor, to be printed, or to be recorded.

The resolution converter 18 converts the size of the captured image depending on whether to display and output the captured image as a through image on a monitor display 25 or to save the captured image on a recording medium.

The image codec processing unit 19 converts the image signal in the RGB color system into an image signal including a luma component (Y) and chroma components (Cr/Cb), and then applies coding compression processing, such as Joint Photographic Experts Group (JPEG) compression or Moving Picture Experts Group (MPEG) compression, to the image signal in the YUV color system. By converting the color space from RGB to YUV, data compression becomes easier to deal with since the human eyes' visibility characteristics are such that the resolving power is higher for luminance than for color.

The memory control unit 20 controls an access operation for reading or writing data, such as captured image information, from or to a memory device 24 implemented by, for example, a synchronous dynamic random-access memory (SDRAM).

The media control unit 22 includes a slot for loading a removable recording medium 26, such as a memory stick®, and reads/writes data from/to the recording medium 26. The media control unit 22 records, for example, a captured image file held on the memory device 24 onto the recording medium 26.

The monitor display 25 is implemented by, for example, a liquid crystal display (LCD) or a thin display panel of another type. The display control unit 21 controls driving of the monitor display 25 and converts image data (through image) output from the camera-signal processing unit 17, image data held on the memory device 24, or image data read from the recording medium 26 and decoded by the image codec processing unit 19 into a signal to be displayed on the monitor display 25 and outputs the signal to the monitor display 25.

Besides the fact that a through image is displayed on the monitor display 25, a menu screen, various setting screens, and various items of warning information are combined in accordance with a request from a control unit 27 described later, and the combined information is displayed and output as an "on screen display" (OSD). A touch sensor is provided on the surface of the monitor display 25, and accordingly, the monitor display 25 serves also as a touch panel. Coordinates recognized by the touch panel are the same as coordinates displayed on a display screen of the monitor display 25. Therefore, a photographer can directly specify, on the display screen of the monitor display 25, a photographic subject to be subjected to smile detection or another graphical user interface (GUI) component.

The camera DSP unit 16 is connected to the control unit 27 via a bus interface unit (BIU) (operation unit) 23. The control unit 27 includes a user interface (UI) unit 28, the CPU 29, which controls the overall operation of the entire apparatus in accordance with a user operation, a random-access memory (RAM) 30 serving as a main storage memory for the CPU 29, and an electrically erasable and programmable read-only memory (EEPROM) 31 that holds program code and apparatus information in a non-volatile manner.

The CPU 29 performs image capturing control in accordance with the recognition of a specific pattern in a photographic subject, such as a person, included in an image included in a captured image (image frame developed on the memory device 24). In the present embodiment, image capturing control is suitably performed on the basis of the correlation between the results of recognition of faces of multiple persons recognized in the image. The image capturing control will be described in detail later. The CPU 29 also performs GUI processing for displaying an OSD on the monitor display 25.

The UI unit 28 has an operation function for allowing a user to enter instructions and an output function as in a loudspeaker or a light-emitting diode (LED) lamp. The UI unit 28 has, as the operation function, for example, a shutter key button and keys and a dial for entering various settings, such as turning on/off of a flash. A control signal in accordance with a user operation entered using these keys or the like is input to the CPU 29. Using the output function, the UI unit 28 outputs a sound, such as an alarm, or emits light or flashes light using the LED, thereby sending information regarding camera work as a feedback to a user. A flash emitting unit 32 emits a flash of light in accordance with flash control information from the control unit 27.

In the digital still camera 1, light is received at the image pickup device 11 and is converted into an electric signal. The electric signal is sequentially supplied to the AFE unit 12, which applies CDS processing and AFE processing to the electric signal and then converts the processed electric signal into a digital signal. The camera-signal processing unit 17 performs image quality correction on the digital image signal supplied from the AFE unit 12 and finally converts the image-quality-corrected digital image signal into a signal having a luma component (Y) and chroma components (R−Y and B−Y), and outputs the signal. Image data output from the camera-signal processing unit 17 is converted by the display control unit 21 into an image signal to be displayed, and a through image is displayed on the monitor display 25.

Nowadays, digital cameras with the face recognition function are becoming more and more general. The digital still camera 1 according to the present embodiment performs image capturing control on the basis of the correlation between the results of recognition of faces of multiple persons recognized in an image.

The correlation between multiple photographic subjects can be estimated on the basis of, for example, the distance between the photographic subjects. For example, a method of controlling the timing of a shutter by setting a self timer on the basis of the correlation regarding the arrangement of photographic subjects, such as the distance between detected faces, is conceivable. However, photographic subjects may happen to be close to each other, such as when they meet by chance. The inventors believe that no accurate image capturing control can be performed only by using the distance between detected faces. In other words, if image capturing control is performed on the basis of a single parameter, namely, the distance between detected faces, the shutter may by released at an undesired time, or the shutter may not be released at an appropriate image capturing time.

Therefore, when capturing an image including multiple photographic subjects, the digital still camera 1 according to a first embodiment of the present invention detects, from the individual photographic subjects, a plurality of face recognition parameters including the degree of smiling, the position in an image frame, the inclination of the detected face, and an attribute such as sex of each photographic subject, and, on the basis of the correlation among the detected face recognition parameters, performs image capturing control. Specifically, the degree of intimacy between photographic subjects can be represented by a numeral which may be called a "degree of friendliness" on the basis of the distance between detected faces and the degree of smiling and inclination of each face. If the calculated degree of friendliness exceeds a predetermined threshold, image capturing control is activated to determine the shutter timing, set the self timer, or the like.

Figure 2:
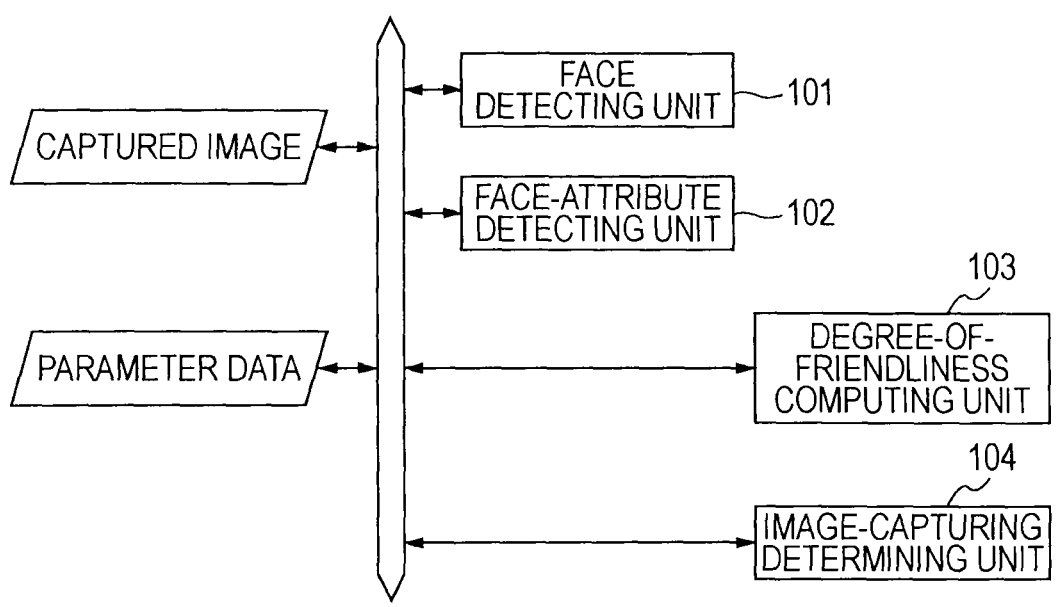
FIG. 2 is a diagram schematically illustrating a functional structure of a system according to a first embodiment of the present invention.

FIG. 2 schematically illustrates a functional structure of a system according to the first embodiment of the present invention. The illustrated system includes a face detecting unit 101, a face-attribute detecting unit 102, a degree-of-friendliness computing unit 103, and an image-capturing determining unit 104.

The face detecting unit 101 detects a face region in an image to be processed (such as a captured image written on the memory device 24). The face detecting unit 101 outputs, as the face detection result, the position (XY coordinates in the image) of the detected face of each photographic subject detected in the image, the size (width and height) of the detected face, and the posture (inclinations about the roll, pitch, and yaw rotation axes) of the detected face. For example, a face detecting apparatus described in Japanese Unexamined Patent Application Publication No. 2004-133637, which has already been assigned to the assignee of the present invention, can be employed.

The face-attribute detecting unit 102 detects attribute information of each detected face detected by the face detecting unit 101 in an image to be processed. The attribute information stated here includes the degree of smiling, sex, age, and race of the detected face. The face detecting unit 101 outputs attribute values indicating these items of attribute information of each detected face. For example, the face-attribute detecting unit 102 can be implemented by a target detecting apparatus that can be obtained by performing ensemble learning using a determining device including multiple determining units, which employ a statistical learning algorithm such as Adaboost. For the details of a target detecting apparatus of this type, please see, for example, Japanese Unexamined Patent Application Publication No. 2005-157679, which has already been assigned to the assignee of the present invention.

The degree-of-friendliness computing unit 103 performs computing to represent the degree of intimacy between photographic subjects as an evaluation value $H_{love}$ called a "degree of friendliness" on the basis of the position, size, and angle information of each detected face, which are output from the face detecting unit 101, and the degree of smiling and other face attribute information output from the face-attribute detecting unit 102. For example, when two detected faces, which are close to each other, face each other (i.e., the normal vectors of the detected faces intersect near each other's face), and when the degrees of smiling of the detected faces are high, it is determined that the degree of friendliness is high, and accordingly, image capturing control is performed (a parameter output from the face-attribute detecting unit 102 is used to indicate a degree of smiling). A degree-of-friendliness computing process will be described in detail later.

The image-capturing determining unit 104 determines the correlation between the photographic subjects on the basis of the evaluation value indicating the degree of intimacy between the photographic subjects, namely, the degree of friendliness $H_{love}$, which is output from the degree-of-friendliness computing unit 103, and determines whether to activate image capturing control such as determining of the shutter timing or setting of the self timer.

Figure 3:
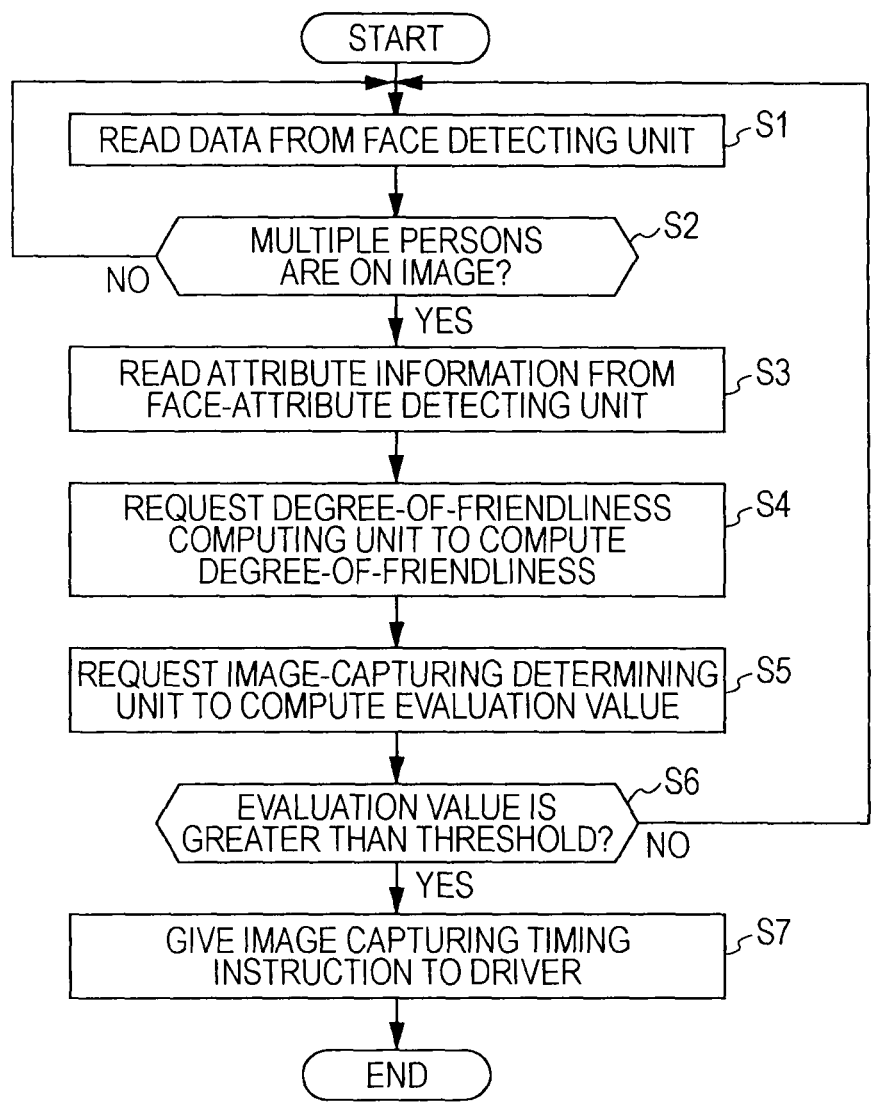
FIG. 3 is a flowchart illustrating a processing procedure for performing image capturing control on the basis of the correlation between face recognition parameters of individual photographic subjects in the system illustrated in FIG. 2.

FIG. 3 is a flowchart illustrating a processing procedure for performing image capturing control on the basis of the correlation between face recognition parameters of individual photographic subjects in the system illustrated in FIG. 2.

Detected data obtained by the face detecting unit 101 is read out (step S1). It is determined whether multiple faces have been detected (step S2). When the check result is affirmative, the flow proceeds to a subsequent process for performing image capturing determination.

Next, attribute information, such as a degree of smiling, of each detected face is read out from the face-attribute detecting unit 102 (step S3). The attribute information is input to the degree-of-friendliness computing unit 103, and a computing request for the degree-of-friendliness computing unit 103 is issued (step S4). The degree-of-friendliness computing unit 103 computes the evaluation value indicating the degree of intimacy between the photographic subjects, namely, the degree of friendliness $H_{love}$, on the basis of the attribute information of each detected face. The computing process will be described in detail later.

An evaluation-value computing request is issued for the image-capturing determining unit 104 (step S5). On the basis of the degree of friendliness $H_{love}$ output from the degree-of-friendliness computing unit 103, the image-capturing determining unit 104 computes an evaluation value H for determining whether to activate image capturing control such as determining of the shutter timing or setting of the self timer.

When the evaluation value H exceeds a predetermined threshold (YES in step S6), the CPU 29 issues an instruction for the driver 10a to control the shutter timing or the self timer setting (step S7).

Figure 4:
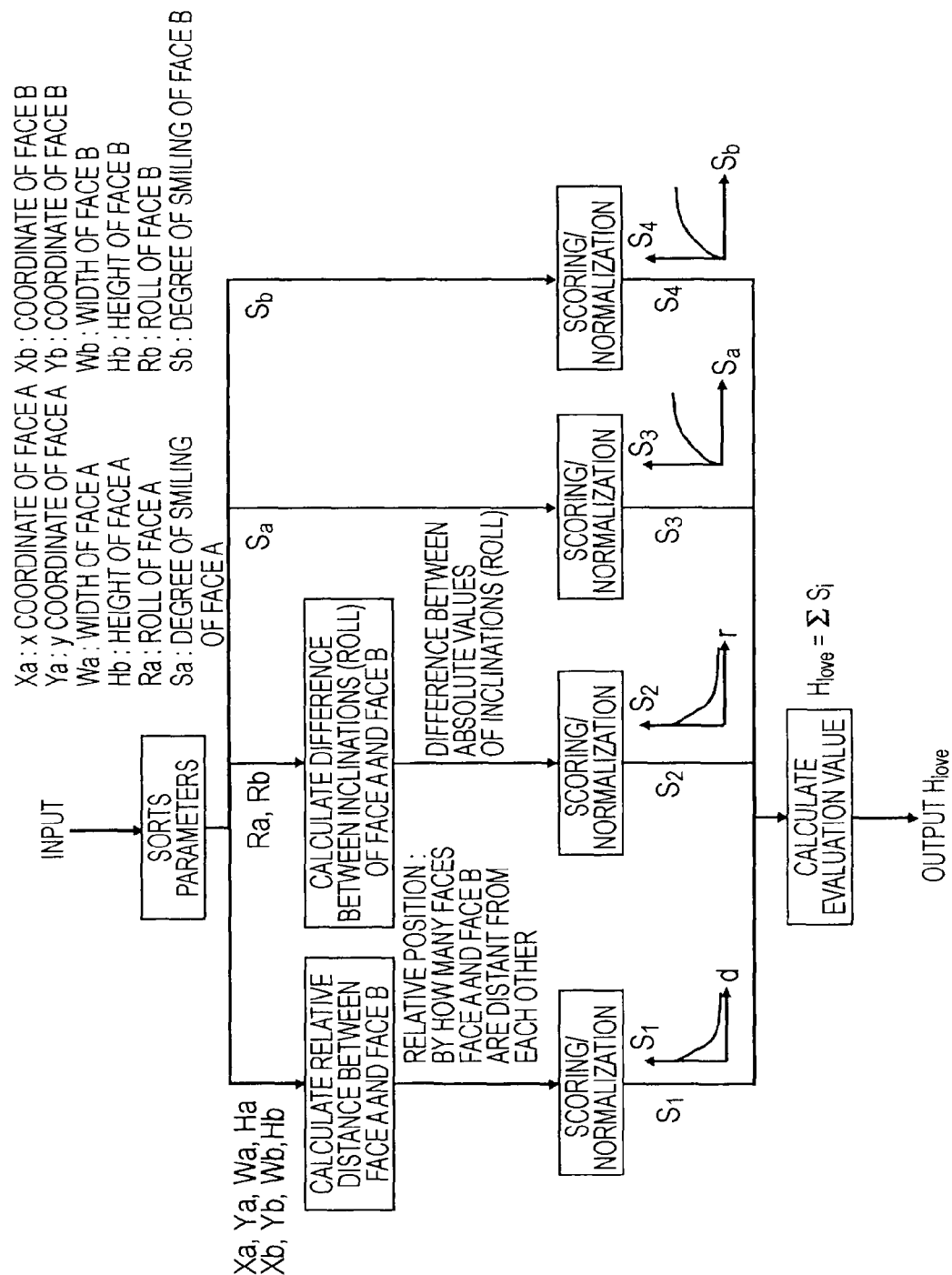
FIG. 4 is a diagram illustrating, using a degree-of-friendliness computing unit, a procedure of a degree-of-friendliness computing process in which the degree of intimacy between photographic subjects is represented by an evaluation value called a "degree of friendliness"

FIG. 4 is a diagram illustrating, using the degree-of-friendliness computing unit 103, a procedure of a degree-of-friendliness computing process in which the degree of intimacy between photographic subjects is represented by an evaluation value called a "degree of friendliness". In FIG. 4, in order to simplify the description, it is assumed that photographic subjects whose faces have been detected are two persons, A and B.

The degree-of-friendliness computing unit 103 can use, as input parameters, position information, size (i.e., width and height), and angle information (the rotation angles about the roll, yaw, and pitch axes) of the detected faces A and B, which are detection results obtained by the face detecting unit 101, and the degrees of smiling and other attribute information of the detected faces A and B, which are detection results obtained by the face-attribute detecting unit 102.

It is assumed that the degrees of smiling of the detected faces A and B are degrees of smiling $S_a$ and $S_b$ output from the face-attribute detecting unit 102. Also, the relative distance d between the detected faces A and B is represented as by how many faces the detected faces A and B are away from each other and is computed by:

$$d = \frac{\sqrt{(X_a - X_b)^2}}{(W_a + W_b)/2} + \frac{\sqrt{(Y_a - Y_b)^2}}{(H_a + H_b)/2} \qquad (1)$$

It is also assumed that the difference r between the inclinations of the detected faces A and B is the difference between the absolute values of the inclinations $R_a$ and $R_b$ of the roll axis of the detected faces A and B (the absolute values are used in order to regard the opposite inclinations, such as +30 degrees and −30 degrees, as the same inclination):

$$r = ||R_a| - |R_b|| \qquad (2)$$

The evaluation values of the individual elements i are scored or normalized, and the obtained score values Si are summed using the following equation, thereby obtaining an evaluation value $H_{love}$, which is then output to the image-capturing determining unit 104:

$$H_{love} = \Sigma S_i \qquad (3)$$

A second embodiment of the present invention will now be described. In the second embodiment, as in the above-described first embodiment, the degree of friendliness between photographic subjects is computed on the basis of the distance between detected faces and the degrees of smiling of the detected faces. Furthermore, the correlation between the positions or angles of the detected faces is evaluated, and accordingly, image capturing control is performed. That is, it is evaluated whether the arrangement of detected faces matches a position pattern, an angle pattern, or a position/angle pattern indicating that the detected faces are arranged such that a photograph with a sense of togetherness can be easily captured, or the detected faces are arranged to imply that the photographic subjects are good friends. Together with the degree of friendliness, an overall evaluation is made, and accordingly, accurate image capturing control that determines the shutter timing, sets the self timer, or the like is implemented.

Figure 5:
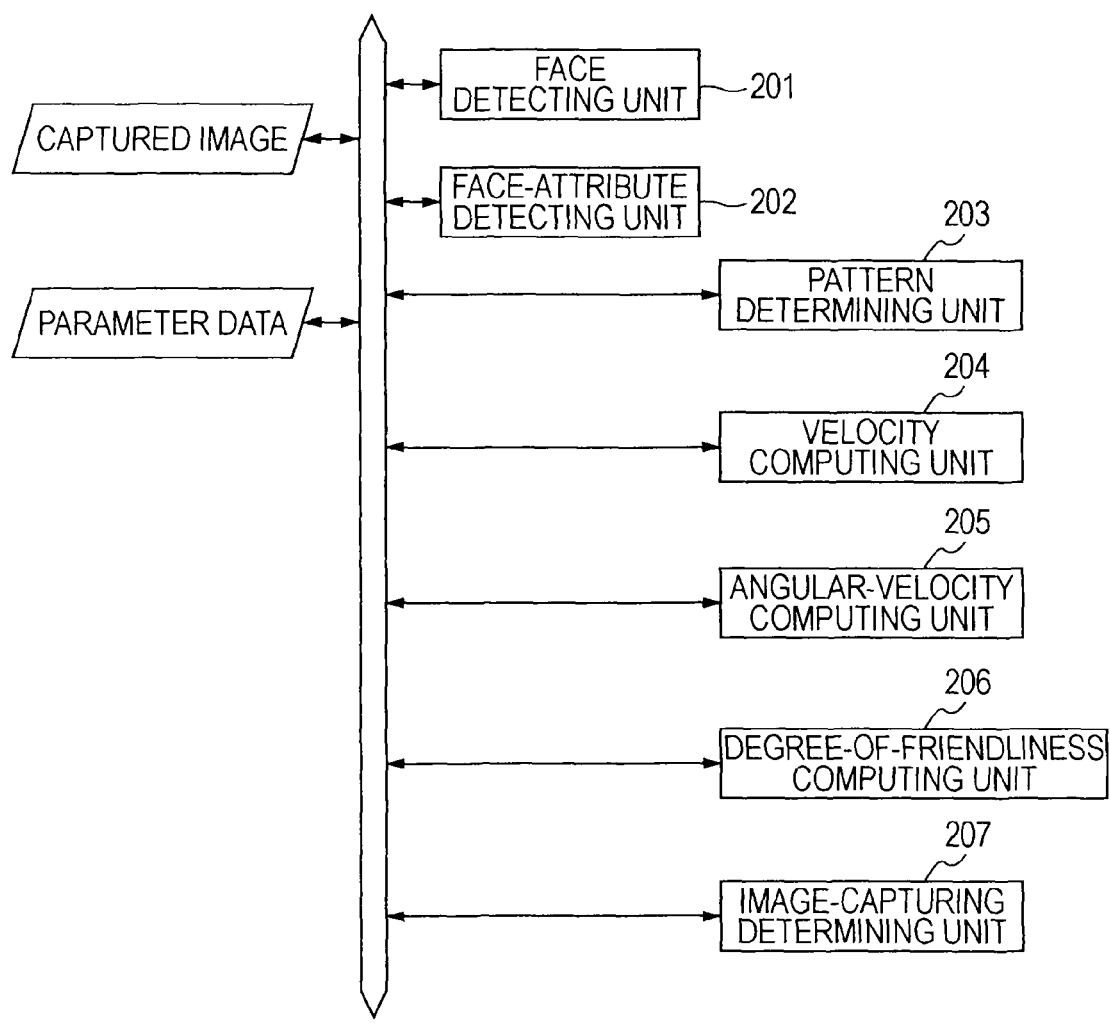
FIG. 5 is a diagram schematically illustrating a functional structure of a system according to a second embodiment of the present invention.

FIG. 5 is a diagram schematically illustrating a functional structure of a system for detecting, at the time of capturing an image including multiple photographic subjects, a plurality of face recognition parameters and performing image capturing control on the basis of the correlation between the detected face recognition parameters. The illustrated system includes a face detecting unit 201, a face-attribute detecting unit 202, a pattern detecting unit 203, a velocity computing unit 204, an angular-velocity computing unit 205, a degree-of-friendliness computing unit 206, and an image-capturing determining unit 207.

The face detecting unit 201 detects a face region in an image to be processed (such as a captured image written on the memory device 24). The face detecting unit 201 outputs, as the face detection result, the position (XY coordinates in the image) of the detected face of each photographic subject detected in the image, the size (width and height) of the detected face, and the posture (inclinations about the roll, pitch, and yaw rotation axes) of the detected face. These are the same as described above.

The face-attribute detecting unit 202 detects attribute information of each detected face detected by the face detecting unit 201 in an image to be processed. The attribute information stated here includes the degree of smiling, sex, age, and race of the detected face. The face detecting unit 201 outputs attribute values indicating these items of attribute information of each detected face. These are the same as described above.

The pattern detecting unit 203 detects whether an image to be processed matches any of patterns with which an image capturing intention can be read from the arrangement of detected faces detected by the face detecting unit 201 in the image. The patterns stated here can be roughly organized into a group of position patterns between detected faces and a group of posture or angle patterns of detected faces.

Figure 6A:
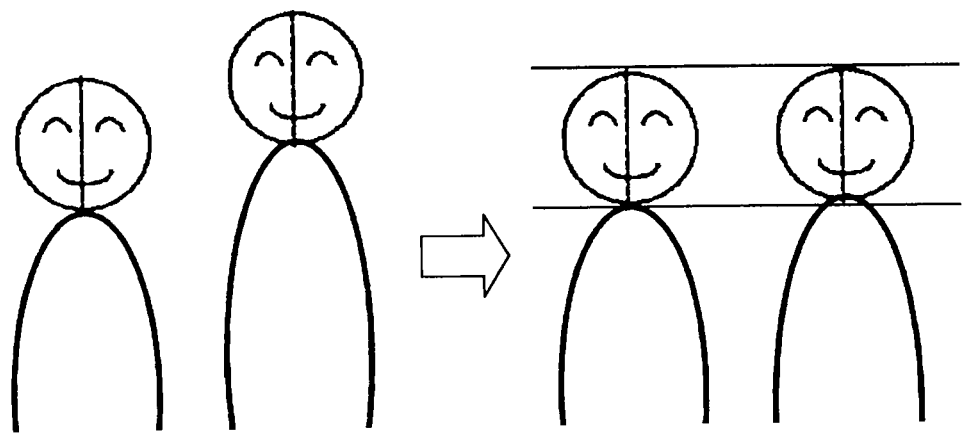
FIG. 6A is an illustration of a position pattern applicable as an index that represents the degree of friendliness between photographic subjects.
Figure 6B:
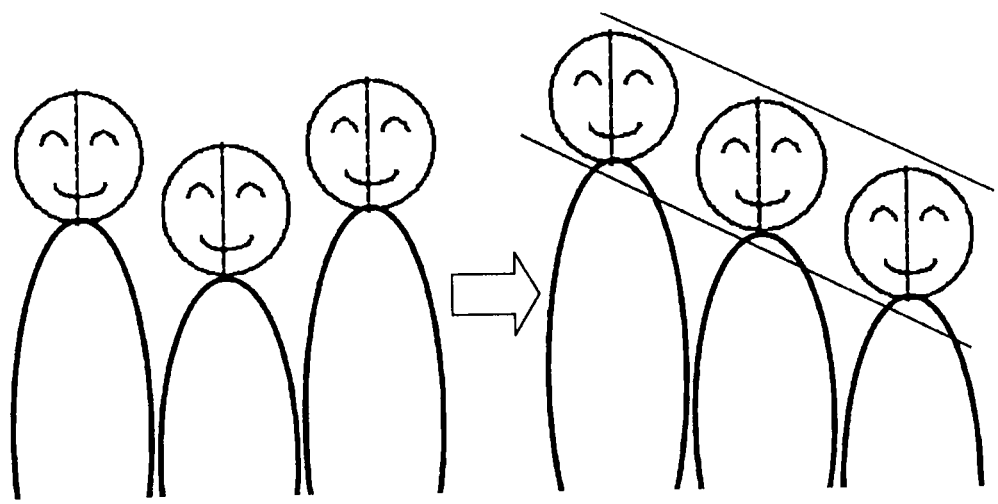
FIG. 6B is an illustration of a position pattern applicable as an index that represents the degree of friendliness among photographic subjects.

FIGS. 6A and 6B illustrate position patterns from which an image capturing intention of photographic subjects can be read.

As illustrated in FIG. 6A, when two or more detected faces are at the same height, an image capturing intention of the photographic subjects can be read. Accordingly, the arrival of time to perform image capturing control can be detected. As illustrated in FIG. 6B, when three or more detected faces are aligned on a straight line, an image capturing intention of the photographic subjects can be read. Accordingly, the arrival of time to perform image capturing control can be detected. Linear position patterns such as those illustrated in FIGS. 6A and 6B can be applied as indices for expressing degrees of friendliness to a group of photographic subjects including two, three, or more persons. In particular, when a straight line rendered by connecting the detected faces of photographic subjects is horizontal, the photographic subjects with different heights might have aligned themselves so that their faces would have been at the same height. Accordingly, it can be regarded that these photographic subjects are particularly good friends.

Figure 6C:
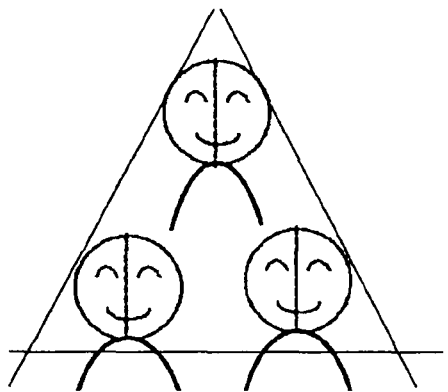
FIG. 6C is an illustration of a position pattern applicable as an index that represents the degree of friendliness among photographic subjects.
Figure 6D:
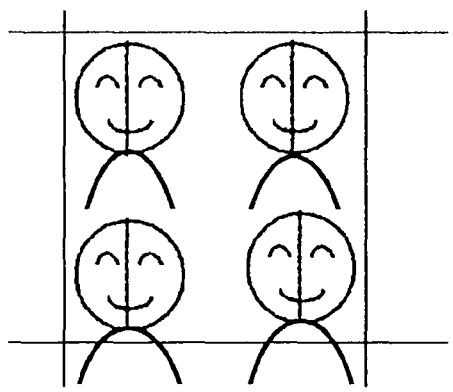
FIG. 6D is an illustration of a position pattern applicable as an index that represents the degree of friendliness among photographic subjects.
Figure 6E:
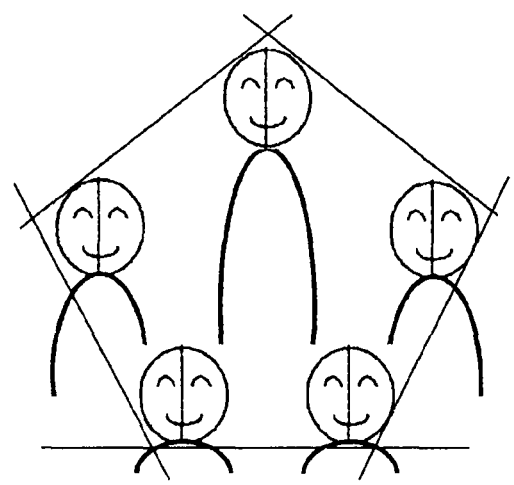
FIG. 6E is an illustration of a position pattern applicable as an index that represents the degree of friendliness among photographic subjects.

As illustrated in FIGS. 6C, 6D, and 6E, when three, four, or five photographic subjects form a specific geometrical pattern, such as a triangle, a rectangle, or a pentagon, having the detected faces of the photographic subjects as vertices, an image capturing intention of the photographic subjects can be read. Accordingly, the arrival of time to perform image capturing control can be detected. Polygonal patterns such as those illustrated in FIGS. 6C, 6D, and 6E can be applied as indices for expressing degrees of friendliness to a group of photographic subjects including three or more persons. With polygonal patterns, photographs with a sense of togetherness can be more easily captured than with the above-described linear patterns. The alignment of the positions of photographic subjects becomes more difficult as the number of persons increases. Therefore, a strong sense of achievement can be felt when a polygonal pattern is formed.

Figure 7A:
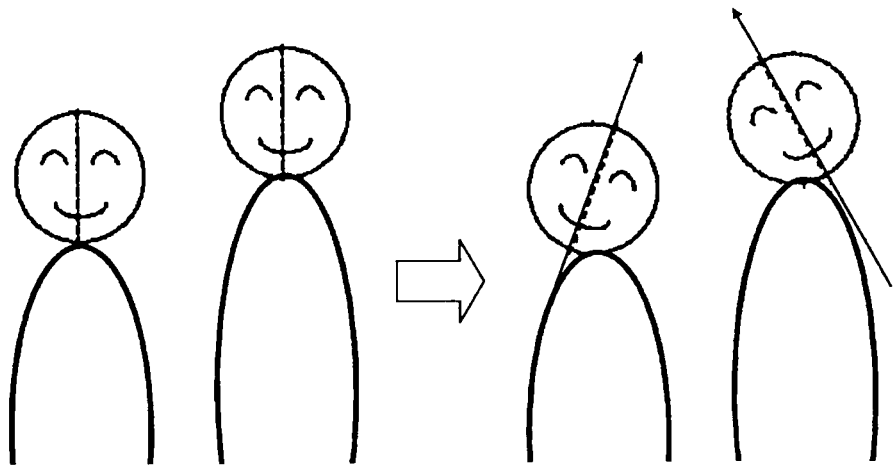
FIG. 7A is an illustration of an angle pattern applicable as an index that represents the degree of friendliness between photographic subjects.
Figure 7B:
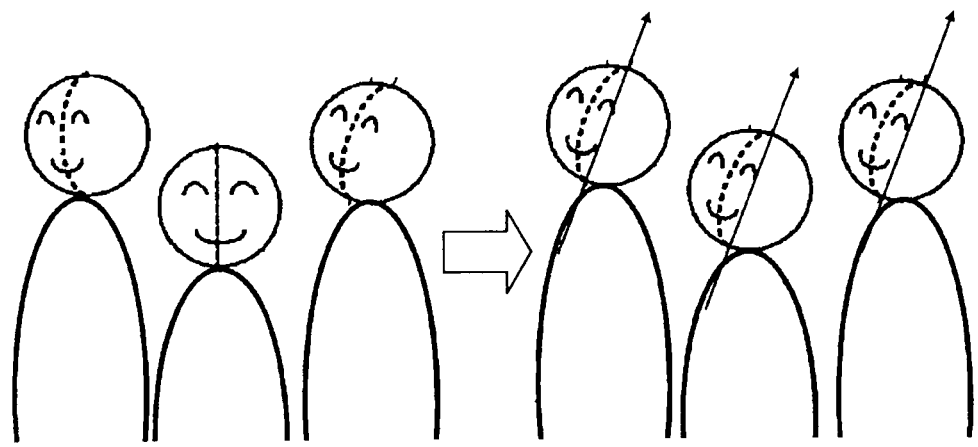
FIG. 7B is an illustration of an angle pattern applicable as an index that represents the degree of friendliness among photographic subjects.

FIGS. 7A and 7B illustrate angle patterns from which an image capturing intention of photographic subjects can be read. When two detected faces face inward as illustrated in FIG. 7A, or when multiple detected faces face a certain direction as illustrated in FIG. 7B, an image capturing intention of the photographic subjects can be read. That is, it can be estimated that the photographic subjects have developed a close relationship, and accordingly, the arrival of time to perform image capturing control can be detected. Angle patterns such as those illustrated in FIGS. 7A and 7B can be applied as indices for expressing degrees of friendliness to a group of photographic subjects including two, three, or more persons. When the angle patterns are applied to two photographic subjects, it can be regarded that an intimate photograph can be captured. When the angle patterns are applied to a group of three or more persons, a photograph with a sense of togetherness can be captured.

These position patterns, angle patterns, and position/angle patterns of combinations of the arrangement and angles are stored as, for example, pattern data in the EEPROM 31. By performing geometrical calculations or the like, the pattern detecting unit 203 collates the positions and posture information of detected faces with the foregoing position patterns, angle patterns, and position/angle patterns to determine whether the detected faces match any of these patterns, and outputs the result as a pattern evaluation value $H_{pattern}$. A pattern detecting process will be described in detail later.

Figure 8:
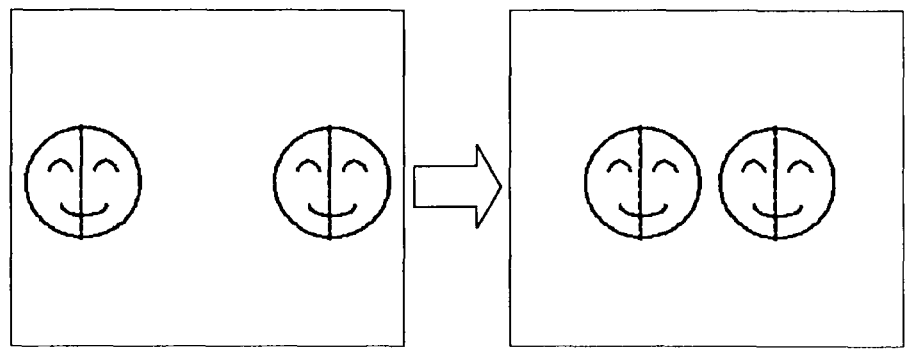
FIG. 8 is an illustration of the manner in which a velocity computing unit tracks position information of each photographic subject detected by a face detecting unit in a time-sequential manner.
Figure 9:
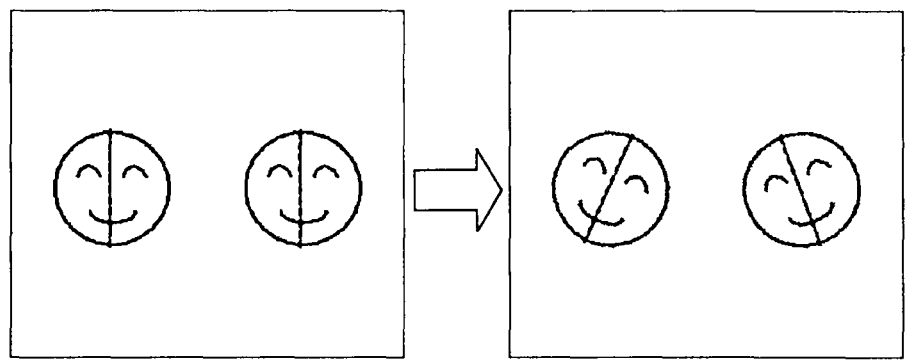
FIG. 9 is an illustration of the manner in which an angular-velocity computing unit tracks angle information of each photographic subject detected by the face detecting unit in a time-sequential manner.

The velocity computing unit 204 and the angular-velocity computing unit 205 detect whether time-sequential changes in the position and time-sequential changes in the posture of the individual detected faces match any of the patterns from which an image capturing intention of photographic subjects can be read. The velocity computing unit 204 time-sequentially tracks position information of each photographic subject detected by the face detecting unit 201. As illustrated in FIG. 8, the velocity computing unit 204 sequentially measures the distance between detected faces. At a point at which the detected faces become closest to each other, an image capturing intention of the photographic subjects can be detected. As illustrated in FIG. 9, the angular-velocity computing unit 205 sequentially detects the angle of each photographic subject. For example, at a point at which the inclination of each detected face becomes close to an inward angle, an image capturing intention of the photographic subjects can be detected. Computing processes performed by the velocity computing unit 204 and the angular-velocity computing unit 205 will be described in detail later.

Figure 10:
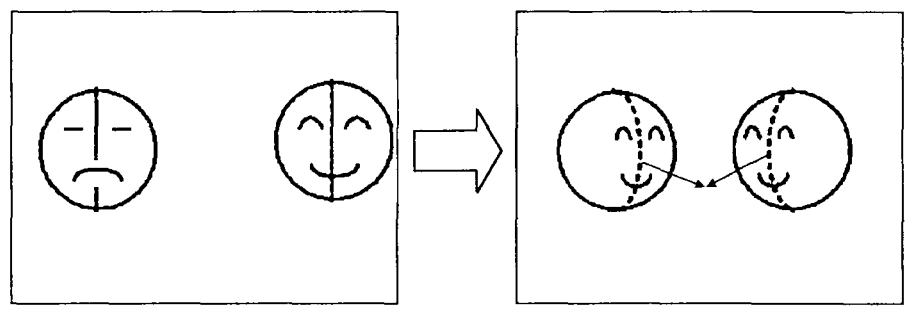
FIG. 10 is an illustration of an example of the correlation between detected faces determined to have a high degree of friendliness.

The degree-of-friendliness computing unit 206 performs computing to represent the degree of intimacy between photographic subjects as an evaluation value $H_{love}$ called a "degree of friendliness" on the basis of the position, size, and angle information of each detected face, which are output from the face detecting unit 201, and the degree of smiling and other face attribute information output from the face-attribute detecting unit 202. For example, as illustrated in FIG. 10, when two detected faces, which are close to each other, face each other (i.e., the normal vectors of the detected faces intersect near each other's face), and when the degrees of smiling of the detected faces are high, it is determined that the degree of friendliness is high, and accordingly, image capturing control is performed (a parameter output from the face-attribute detecting unit 202 is used to indicate a degree of smiling). A degree-of-friendliness computing process will be described in detail later.

The image-capturing determining unit 207 makes an overall determination on the correlation between photographic subjects on the basis of the evaluation value $H_{pattern}$ indicating the degree of match between the correlation of multiple detected faces with a desired position pattern or angle pattern (see FIGS. 6A to 7B), which is obtained from the pattern detecting unit 203, and the evaluation value indicating the degree of intimacy between the photographic subjects, namely, the degree of friendliness $H_{love}$, which is output from the degree-of-friendliness computing unit 206, thereby determining whether to activate image capturing control such as determining of the shutter timing or setting of the self timer.

Figure 11:
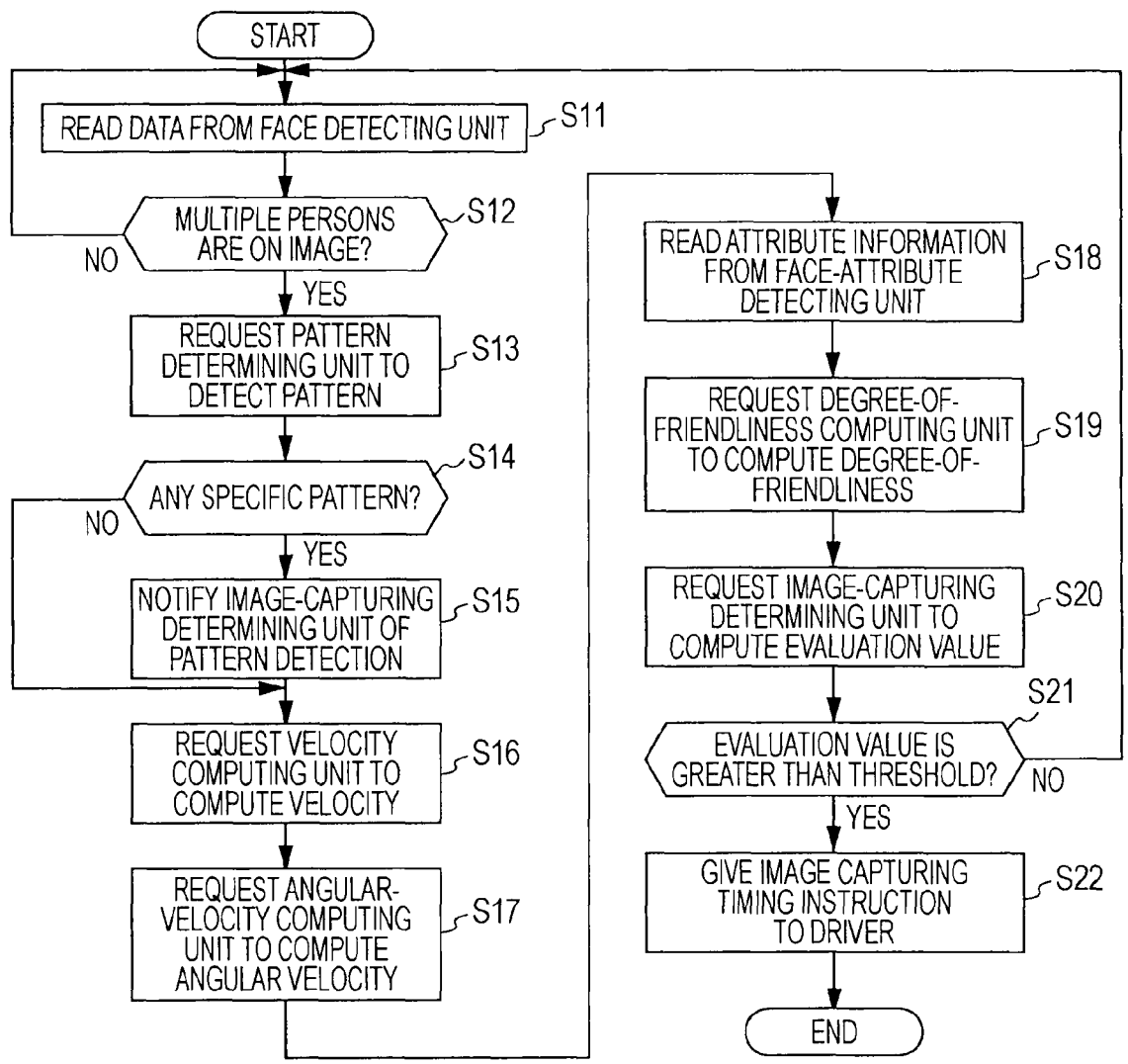
FIG. 11 is a flowchart illustrating a processing procedure for performing image capturing control on the basis of the correlation between face recognition parameters of individual photographic subjects.

FIG. 11 is a flowchart illustrating a processing procedure for performing image capturing control on the basis of the correlation between face recognition parameters of individual photographic subjects in the system illustrated in FIG. 5.

Detected data obtained by the face detecting unit 201 is read out (step S11). It is determined whether multiple faces have been detected (step S12). When the check result is affirmative, the flow proceeds to a subsequent process for performing image capturing determination.

A pattern detecting request is issued for the pattern detecting unit 203 (step S13). When the pattern detecting unit 203 obtains detected face data obtained by the face detecting unit 201, the pattern detecting unit 203 determines whether the correlation of the detected faces matches any of desired position patterns or angle patterns (see FIGS. 6A to 7B) by comparing the correlation with the desired position patterns or angle patterns. When the correlation between the detected faces matches any of the desired position patterns or angle patterns (YES in step S14), the evaluation value $H_{pattern}$ indicating the degree of match is output to the image-capturing determining unit 207 (step S15). A computing process performed by the pattern detecting unit 203 will be described in detail later.

Next, a computing request is issued for the velocity computing unit 204 (step S16). A computing process performed by the velocity computing unit 204 will be described in detail later.

Next, a computing request is issued for the angular-velocity computing unit 205 (step S17). A computing process performed by the angular-velocity computing unit 205 will be described in detail later.

Next, attribute information, such as a degree of smiling, of each detected face is read out from the face-attribute detecting unit 202 (step S18). The attribute information is input to the degree-of-friendliness computing unit 206, and a computing request is issued for the degree-of-friendliness computing unit 206 (step S19). The degree-of-friendliness computing unit 206 computes the evaluation value indicating the degree of intimacy between the photographic subjects, namely, the degree of friendliness $H_{love}$, on the basis of the attribute information of each detected face. This computing process will be described in detail later.

An evaluation-value computing request is issued for the image-capturing determining unit 207 (step S20). The image-capturing determining unit 207 determines whether to activate image capturing control such as determining of the shutter timing or setting of the self timer, on the basis of the evaluation value $H_{pattern}$ indicating the degree of match with a position pattern, an angle pattern, or a position/angle pattern, which is output from the pattern detecting unit 203, and the degree of friendliness $H_{love}$ output from the degree-of-friendliness computing unit 206.

When the evaluation value H exceeds a predetermined threshold (YES in step S21), the CPU 29 issues an instruction for the driver 10a to control the shutter timing or the self timer setting (step S22).

Hereinafter, computing processes performed by the pattern detecting unit 203, the velocity computing unit 204, the angular-velocity computing unit 205, the degree-of-friendliness computing unit 206, and the image-capturing determining unit 207 will be described in detail.

Figure 12:
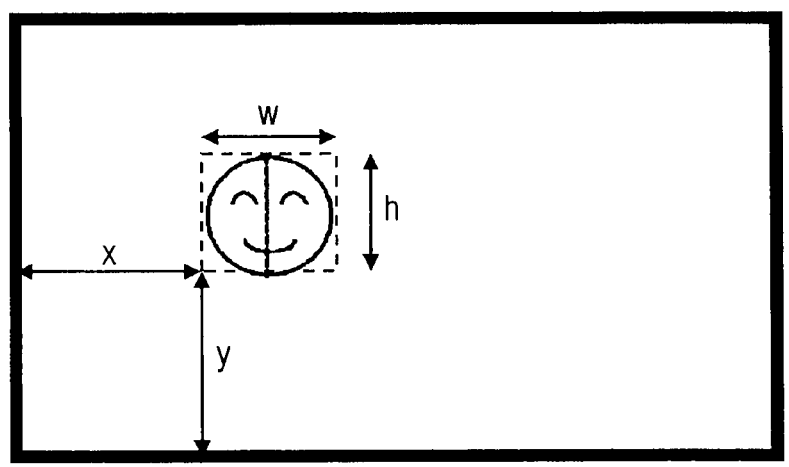
FIG. 12 is an illustration of the coordinates (x, y) of the position, width w, and height h of a detected face in a captured image (displayed on a monitor display)
Figure 13:
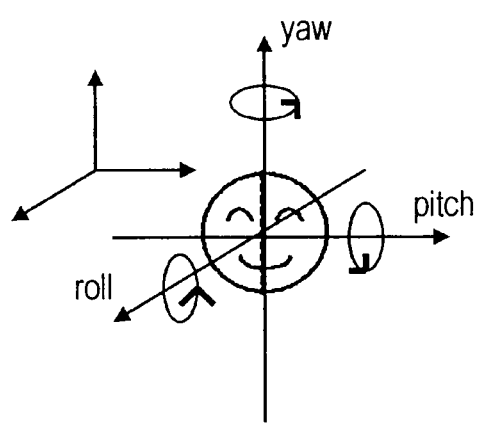
FIG. 13 is an illustration of the inclination of a detected face in a captured image (displayed on the monitor display)

In the following description, the position coordinates (x, y), width w, and height h of a detected face in a captured image (displayed on the monitor display 25) are defined as illustrated in FIG. 12. Also, the angle (inclination) of a detected face includes rotations about three axes, namely, roll, yaw, and pitch, as illustrated in FIG. 13. A position of an n-th detected face is written as D_n(x, y), and the angle of rotation thereof is written as A_n(roll, yaw, pitch).

Position-Pattern Determining Process:

A position-pattern determining process is performed, using the pattern detecting unit 203, in accordance with a pattern detecting request made in step S13 of the flowchart illustrated in FIG. 11.

(1) Items of position information D_n of n (n>1) detected faces (where n is an identification number indicating a person serving as a photographic subject) are obtained from the face detecting unit 201.

Figure 14A:
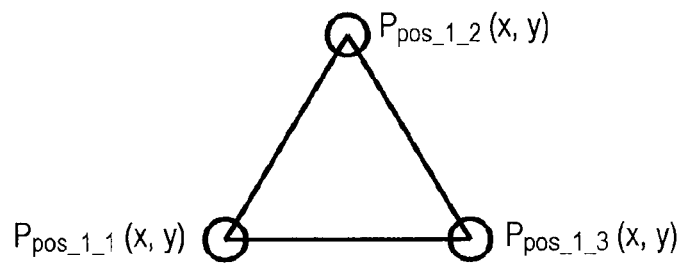
FIG. 14A is an illustration of position information of a triangular pattern.
Figure 14B:
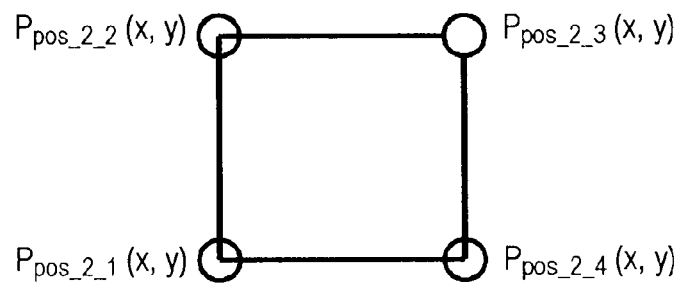
FIG. 14B is an illustration of position information of a rectangular pattern.

(2) Position pattern information subjected to determination is obtained from a storage place such as the EEPROM 31. In the following description, it is assumed that p (p≧1) items of position pattern information are obtained. Each item of position pattern information includes position information $P_{pos\_pattern\_no}(x, y)$ indicating the coordinate position (x, y) of each face number for each pattern number and an evaluation value $P_{val\_pattern}$ for each pattern number. The fact that a polygonal pattern makes it easier to capture a photograph with a sense of togetherness has already been described. FIGS. 14A and 14B illustrate position information of a triangular pattern and position information of a rectangular pattern, respectively.

(3) The following evaluation function $H_{pos}$ is computed p times (that is, for the individual items of position pattern information):

$$H_{pos}(D\_1, D\_2, \ldots, D\_n, P_{pos\_p}, P_{val\_p}) \qquad (4)$$

In the foregoing evaluation function $H_{pos}$, whether the positions D_1, ..., D_n of input detected faces match the position pattern information $P_{pos\_p}$ is computed by performing comparisons. When it is determined that the items of position information D_n match the position pattern information $P_{pos\_p}$, the evaluation value $P_{pos\_p}$ is returned. When it is determined that the items of position information D_n do not match the position pattern information $P_{pos\_p}$, zero is returned.

Angle-Pattern Determining Process:

An angle-pattern determining process is performed, using the pattern detecting unit 203, in accordance with a pattern detecting request made in step S13 of the flowchart illustrated in FIG. 11.

(1) Items of angle information A_n of n (n>1) detected faces (where n is an identification number indicating a person serving as a photographic subject) are obtained from the face detecting unit 201.

Figure 15A:
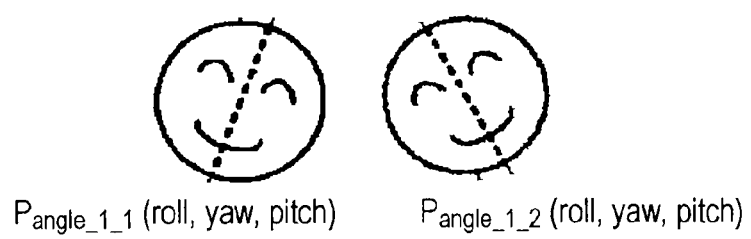
FIG. 15A is an illustration of angle information of an angle pattern in which two photographic subjects face inward.
Figure 15B:
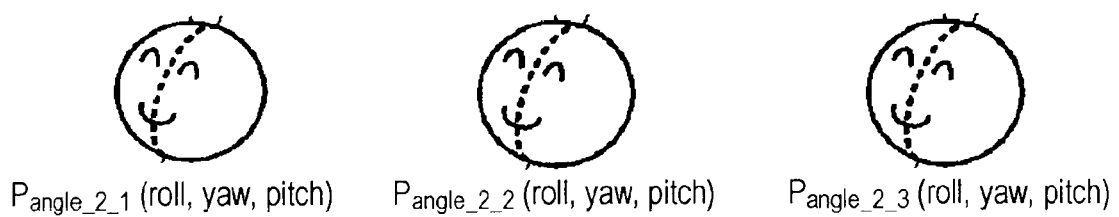
FIG. 15B is an illustration of angle information of an angle pattern in which multiple photographic subjects face a certain direction.

(2) Angle pattern information subjected to determination is obtained from a storage place such as the EEPROM 31. In the following description, it is assumed that p (p≧1) items of angle pattern information are obtained. Each item of angle pattern information includes angle information $P_{angle\_pattern\_no}$(roll, yaw, pitch) indicating the angles of rotations about the roll, yaw, and pitch axes (roll, yaw, pitch) of each face number for each pattern number, and an evaluation value $P_{val\_pattern}$ for each pattern number. The fact that an angle pattern indicating that two photographic subjects face inward, as illustrated in FIG. 7A, or multiple photographic subjects face a certain direction, as illustrated in FIG. 7B, makes it easier to capture a photograph with a sense of togetherness has already been described. FIGS. 15A and 15B illustrate angle information of an angle pattern in which two photographic subjects face inward and angle information of an angle pattern in which multiple photographic subjects face a certain direction, respectively.

(3) The following evaluation function $H_{angle}$ is computed p times (that is, for the individual items of angle pattern information):

$$H_{angle}(A\_1, A\_2, \ldots, A\_n, P_{angle\_q}, P_{val\_q}) \qquad (5)$$

In the foregoing evaluation function $H_{angle}$, whether the angles A_1, ..., A_n of input detected faces match the angle pattern information $P_{angle\_q}$ is computed by performing comparisons. When it is determined that the items of angle information A_n match the angle pattern information $P_{angle\_q}$, the evaluation value $P_{val\_q}$ is returned. When it is determined that the items of position information A_n do not match the position pattern information $P_{angle\_q}$, zero is returned.

Position/Angle-Pattern Determining Process:

A position/angle-pattern determining process is performed, using the pattern detecting unit 203, in accordance with a pattern detecting request made in step S13 of the flowchart illustrated in FIG. 11.

(1) Items of position information of n (n>1) detected faces are obtained from the face detecting unit 201.

Figure 16:
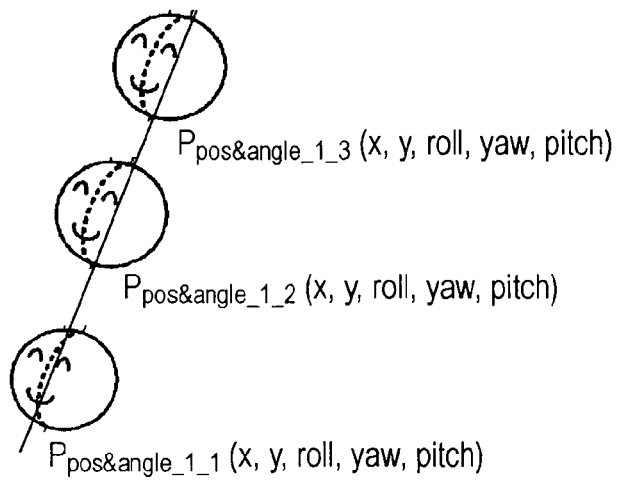
FIG. 16 is an illustration of position/angle information of a position/angle pattern.

(2) Position/angle pattern information subjected to determination is obtained from a storage place such as the EEPROM 31. In the following description, it is assumed that p (p≧1) items of position/angle pattern information are obtained. Each item of position/angle pattern information includes position/angle information $P_{pos\&angle\_pattern\_no}$(x, y, roll, yaw, pitch) indicating the coordinate position and the angle position (x, y, roll, yaw, pitch) of each face number for each pattern number, and an evaluation value $P_{val\_pattern}$ for each pattern number. FIG. 16 illustrates position/angle information of a position/angle pattern considered that would make it easier to capture a photograph with a sense of togetherness.

(3) The following evaluation function $H_{pos\&angle}$ is computed r times (that is, for the individual items of position/angle pattern information):

$$H_{pos\&angle}(D\_1, A\_1, D\_2, A\_2, \ldots, D\_n, A\_n, P_{pos\_angle\_r}, P_{val\_r}) \quad (6)$$

In the foregoing evaluation function $H_{pos\&angle}$, whether the positions $D\_1, \ldots, D\_n$ and the angles $A\_1, \ldots, A\_n$ of input detected faces match the position/angle pattern information $P_{pos\&angle\_p}$ is computed by performing comparisons. When it is determined that the items of position/angle information $D\_n$ and $A\_n$ match the position/angle pattern information $P_{pos\&angle\_p}$ the evaluation value $P_{val\_q}$ is returned. When it is determined that the items of position/angle information $D\_n$ and $A\_n$ do not match the position/angle pattern information $P_{pos\&angle\_p}$, zero is returned.

Pattern Determining Process:

A pattern determining process is performed, using the pattern detecting unit 203, in accordance with a pattern detecting request made in step S13 of the flowchart illustrated in FIG. 11, on the basis of the results of the foregoing position-pattern determining process, angle-pattern determining process, and position/angle-pattern determining process. Specifically, as illustrated in the following equation, a pattern evaluation value $H_{pattern}$ including the sum of the evaluation values $H_{pos}$, $H_{angle}$, and $H_{pos\&angle}$ of the pattern determining processes is computed, and the pattern evaluation value $H_{pattern}$ is output to the image-capturing determining unit 207:

$$H_{pattern} = \sum_{p=1}^{p} H_{pos} + \sum_{q=1}^{q} H_{angle} + \sum_{r=1}^{r} H_{pos\&angle} \quad (7)$$

Velocity Computing Process:

A velocity computing process is performed, using the velocity computing unit 204, in accordance with a computing request made in step S16 of the flowchart illustrated in FIG. 11. This velocity computing process determines whether time-sequential changes in the position of the individual detected faces match any of patterns from which an image capturing intention of photographic subjects can be read.

(1) Items of position information $D\_n$ of detected faces (where n is an identification number indicating a person serving as a photographic subject) at time $t_{u-1}$ are obtained from the face detecting unit 201.

(2) The moving velocity of each detected face is computed.

Figure 17:
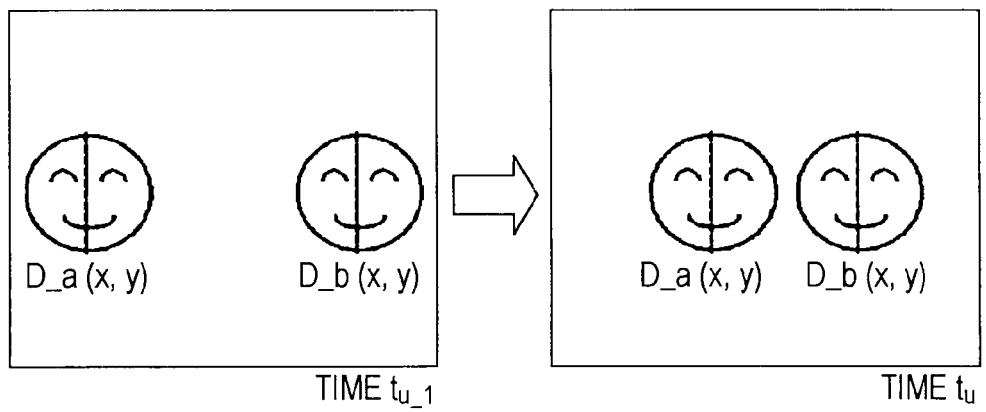
FIG. 17 is an illustration of the manner in which two items of position information D_a(x, y) and D_b(x, y) of detected faces of two photographic subjects a and b move from a time $t_{u-1}$ to a time $t_u$.

FIG. 17 is an illustration of the manner in which two items of position information $D\_a(x, y)$ and $D\_b(x, y)$ of detected faces of two photographic subjects a and b move from a time $t_{u-1}$ to a time $t_u$. The moving velocities (X'a,Y'a) and (X'b,Y'b) of the detected faces in this case are computed using the following equations:

$$\begin{pmatrix} X'a \\ Y'a \end{pmatrix} = \frac{dD\_a}{dt} = \begin{pmatrix} \frac{dx}{dt} \\ \frac{dy}{dt} \end{pmatrix} = \begin{pmatrix} \frac{xa_{t_u} - xa_{t_{u-1}}}{t_u - t_{u-1}} \\ \frac{ya_{t_u} - ya_{t_{u-1}}}{t_u - t_{u-1}} \end{pmatrix} \quad (8)$$

$$\begin{pmatrix} X'b \\ Y'b \end{pmatrix} = \frac{dD\_b}{dt} = \begin{pmatrix} \frac{dx}{dt} \\ \frac{dy}{dt} \end{pmatrix} = \begin{pmatrix} \frac{xb_{t_u} - xb_{t_{u-1}}}{t_u - t_{u-1}} \\ \frac{yb_{t_u} - yb_{t_{u-1}}}{t_u - t_{u-1}} \end{pmatrix}$$

Angular-Velocity Computing Process:

An angular-velocity computing process is performed, using the angular-velocity computing unit 205, in accordance with a computing request made in step S17 of the flowchart illustrated in FIG. 11. This angular-velocity computing process determines whether time-sequential changes in the angle of the individual detected faces match any of patterns from which an image capturing intention of photographic subjects can be read.

(1) Items of angle information $A\_n$ of detected faces (where n is an identification number indicating a person serving as a photographic subject) at time $t_{u-1}$ are obtained from the face detecting unit 201.

(2) The angular velocity of each detected face is computed.

Figure 18:
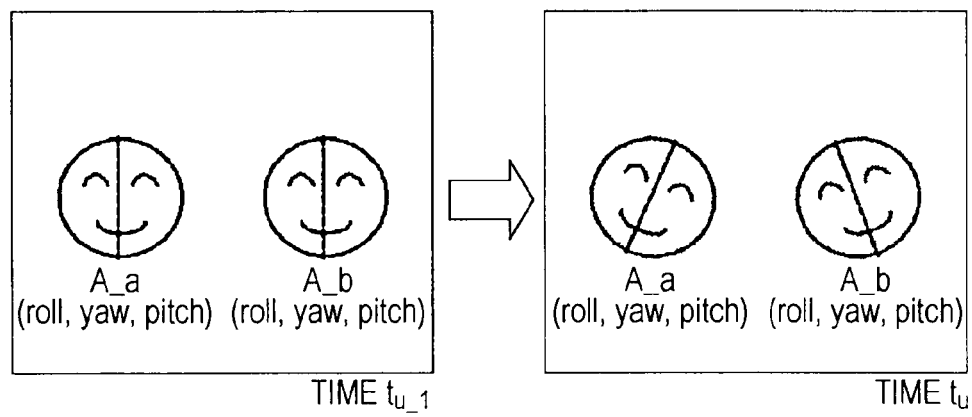
FIG. 18 is an illustration of the manner in which two items of angle information A_a(roll, yaw, pitch) and A_b(roll, yaw, pitch) of detected faces of two photographic subjects a and b move from the time $t_{u-1}$ to the time $t_u$.

FIG. 18 is an illustration of the manner in which two items of angle information $A\_a$(roll, yaw, pitch) and $A\_b$(roll, yaw, pitch) of detected faces of two photographic subjects a and b move from a time $t_{u-1}$ to a time $t_u$. The angular velocities ($\theta_{roll}a$, $\theta_{yaw}a$, $\theta_{pitch}a$) and ($\theta_{roll}b$, $\theta_{yaw}b$, $\theta_{pitch}b$) of the detected faces in this case are computed using the following equations:

$$\begin{pmatrix} \theta''_x a \\ \theta''_y a \\ \theta''_z a \end{pmatrix} = \frac{dA\_a}{dt} = \begin{pmatrix} \frac{d\theta_x a}{dt} \\ \frac{d\theta_y a}{dt} \\ \frac{d\theta_z a}{dt} \end{pmatrix} = \begin{pmatrix} \frac{rolla_{t_u} - rolla_{t_{u-1}}}{t_u - t_{u-1}} \\ \frac{yawa_{t_u} - yawa_{t_{u-1}}}{t_u - t_{u-1}} \\ \frac{pitcha_{t_u} - pitcha_{t_{u-1}}}{t_u - t_{u-1}} \end{pmatrix} \quad (9)$$

$$\begin{pmatrix} \theta''_x b \\ \theta''_y b \\ \theta''_z b \end{pmatrix} = \frac{dA\_b}{dt} = \begin{pmatrix} \frac{d\theta_x b}{dt} \\ \frac{d\theta_y b}{dt} \\ \frac{d\theta_z b}{dt} \end{pmatrix} = \begin{pmatrix} \frac{rollb_{t_u} - rollb_{t_{u-1}}}{t_u - t_{u-1}} \\ \frac{yawb_{t_u} - yawb_{t_{u-1}}}{t_u - t_{u-1}} \\ \frac{pitchb_{t_u} - pitchb_{t_{u-1}}}{t_u - t_{u-1}} \end{pmatrix}$$

Degree-of-Friendliness Computing Process:

A degree-of-friendliness computing process is performed, using the degree-of-friendliness computing unit 206, in accordance with a computing request made in step S19 of the flowchart illustrated in FIG. 11.

Figure 19:
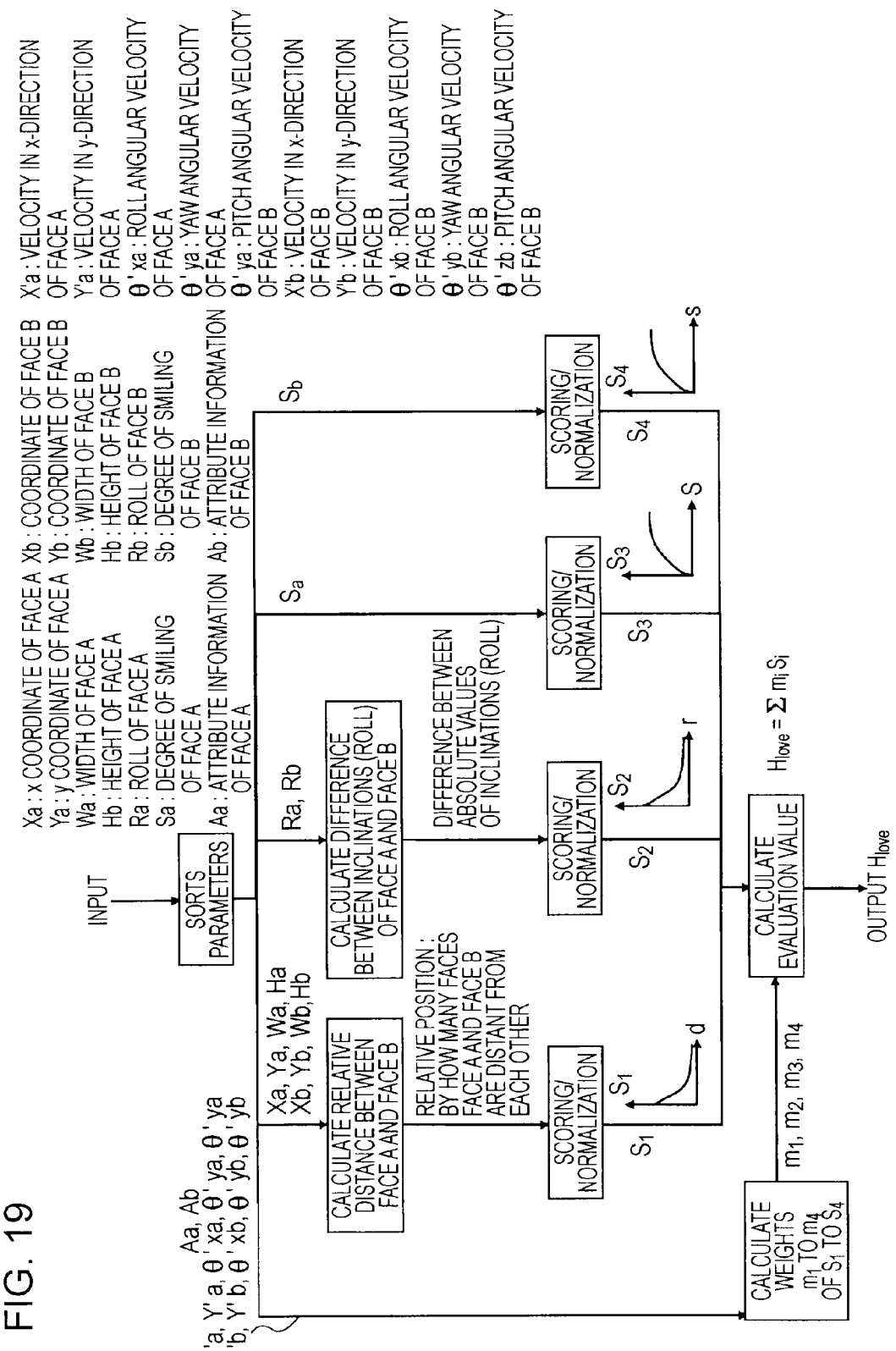
FIG. 19 is a diagram illustrating a procedure of a degree-of-friendliness computing process in which the degree of intimacy between photographic subjects is represented by an evaluation value called a "degree of friendliness"

FIG. 19 is a diagram illustrating, using the degree-of-friendliness computing unit 206, a procedure of a degree-of-friendliness computing process in which the degree of intimacy between photographic subjects is represented by an evaluation value called a "degree of friendliness". In FIG. 19, in order to simplify the description, it is assumed that photographic subjects whose faces have been detected are two persons, A and B.

The degree-of-friendliness computing unit 206 can use, as input parameters, position information, size (i.e., width and height), and angle information (the rotation angles about the roll, yaw, and pitch axes) of the detected faces A and B, which are detection results obtained by the face detecting unit 101, items of velocity information of the detected faces A and B, which are computing results obtained by the velocity computing unit 204, items of angular velocity information (the angular velocities about the roll, yaw, and pitch axes) of the detected faces A and B, which are computing results obtained by the angular-velocity computing unit 205, and the degrees of smiling and other attribute information of the detected faces A and B, which are detection results obtained by the face-attribute detecting unit 102.

In the present embodiment, it is assumed that the relative distance d between the detected faces A and B of the photographic subjects, the difference r between the inclinations of the detected faces A and B, and the degrees of smiling $S_a$ and $S_b$ of the detected faces A and B are elements for determining the degree of friendliness. Also, a weight coefficient $m_i$ is allocated to each element i. In order to determine or calculate each element i and to compute a weight coefficient $m_i$ for each element i, the foregoing input parameters are sorted.

It is assumed that the degrees of smiling of the detected faces A and B are degrees of smiling $S_a$ and $S_b$ output from the face-attribute detecting unit 202. Also, the relative distance d between the detected faces A and B is represented as by how many faces the detected faces A and B are away from each other and is computed by:

$$d = \frac{\sqrt{(X_a - X_b)^2}}{(W_a + W_b)/2} + \frac{\sqrt{(Y_a - Y_b)^2}}{(H_a + H_b)/2} \quad (10)$$

It is also assumed that the difference r between the inclinations of the detected faces A and B is the difference between the absolute values of the inclinations of the roll axis $R_a$ and $R_b$ of the detected faces A and B (the absolute values are used in order to regard the opposite inclinations, such as +30 degrees and −30 degrees, as the same inclination):

$$r = ||R_a| - |R_b|| \quad (11)$$

The evaluation values of the individual elements i are scored or normalized, and the obtained score values $S_i$ are summed using the individual weight coefficients $m_i$ in accordance with the following equation, thereby obtaining an evaluation value $H_{love}$, which is then output to the image-capturing determining unit 204:

$$H_{love} = \Sigma m_i S_i \quad (12)$$

Now, a method of computing a coefficient $m_i$ by which the score value $S_i$ of each element i is multiplied will be described.

A weight $m_1$ for the score $S_1$ based on the relative distance d between the detected faces A and B can be determined, as illustrated in the following equation, on the basis of a function $F_1$ with moving velocities of the detected faces A and B as arguments and a function G with attribute information (other than degrees of smiling) of the detected faces A and B as arguments. The moving velocity of a detected face can be obtained from the velocity computing unit 204.

$$m_1 = F'_1(X'_a, Y'_a, X'_b, Y'_b)G(A_a, A_b) \quad (13)$$

Figure 20A:
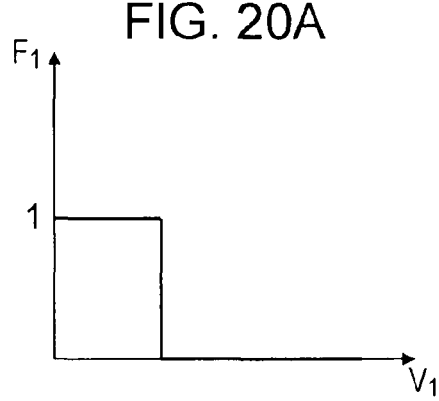
FIG. 20A is a graph illustrating a characteristic of a function $F_1$ for determining a weight $m_1$ for a score value $S_1$ on the basis of a relative distance d between detected faces A and B.
Figure 20B:
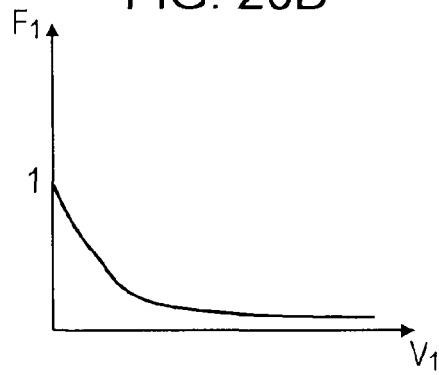
FIG. 20B is a graph illustrating a characteristic of a function $F_1$ for determining a weight $m_1$ for a score value $S_1$ on the basis of a relative distance d between detected faces A and B.

Here, the function $F_1$ is a function that has a characteristic that the function $F_1$ becomes smaller as the sum $V_1$ of the moving velocities of the detected faces A and B (see equation below) becomes greater, as illustrated in FIG. 20A or 20B. When $V_1$ is relatively small, that is, when changes in the positions of the detected faces A and B are not gradual, even if the distance between the detected faces A and B is small, control can be performed not to increase the degree of friendliness $H_{love}$:

$$V_1 = \sqrt{X'^2_a + Y'^2_a} + \sqrt{X'^2_b + Y'^2_b} \quad (14)$$

When attribute information $A_a$ and $A_b$ of the detected faces A and B are divided into, for example, sex and age (adults and children), as illustrated in Table 1 below, the value of G in accordance with a combination of the attribute information $A_a$ and $A_b$ can be used. Values in spaces in Table 1 can be set using various methods. For example, when a photographer receives the tip that a good photograph of two male adults can be captured when they are not so close to each other, if the faces of two male adults are detected, the weight $m_1$ is increased, thereby allowing the shutter to be released even when the male adults are not so close to each other.

TABLE I

|  |  |  | $A_b$ | | | |
|---|---|---|---|---|---|---|
|  |  |  | Adults | | Children | |
|  |  |  | Male | Female | Male | Female |
| $A_a$ | Adults | Male | 2 | 1 | 0.5 | 0.5 |
|  |  | Female | 1 | 2 | 0.5 | 0.5 |
|  | Children | Male | 0.5 | 0.5 | 1 | 1 |
|  |  | Female | 0.5 | 0.5 | 1 | 1 |

A weight $m_2$ for the score $S_2$ based on the difference between the inclinations of the detected faces A and B can be determined, as illustrated in the following equation, on the basis of a function $F_2$ with angular velocities of the detected faces A and B as arguments. The angular velocity of a detected face can be obtained from the angular-velocity computing unit 205.

$$m_2 = F'_2(\theta_{roll_a}', \theta_{yaw_a}', \theta_{pitch_a}', \theta_{roll_b}', \theta_{yaw_b}', \theta_{pitch_b}') \quad (15)$$

Figure 21A:
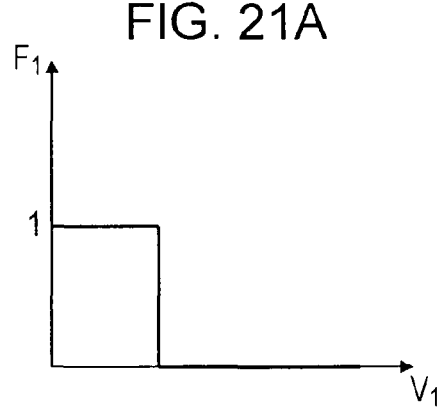
FIG. 21A is a graph illustrating a characteristic of a function $F_2$ for determining a weight $m_2$ for a score value $S_2$ on the basis of a relative distance d between detected faces A and B.
Figure 21B:
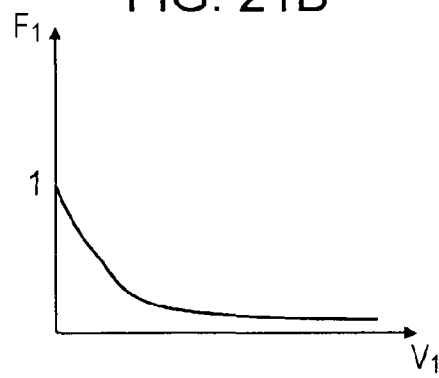
FIG. 21B is a graph illustrating a characteristic of a function $F_2$ for determining a weight $m_2$ for a score value $S_2$ on the basis of a relative distance d between detected faces A and B.

Here, the function $F_2$ is a function that has a characteristic that the function $F_2$ becomes smaller as the sum $V_2$ of the absolute values of the angular velocities of the detected faces A and B (see equation below) becomes greater, as illustrated in FIG. 21A or 21B. When $V_2$ is relatively small, that is, when changes in the inclinations of the detected faces A and B are not gradual, even if the distance between the detected faces A and B is small, control can be performed not to increase the degree of friendliness $H_{love}$:

$$V_2 = |\theta_{roll_a}'| + |\theta_{yaw_a}'| + |\theta_{pitch_a}'| + |\theta_{roll_b}'| + |\theta_{yaw_b}'| + |\theta_{pitch_b}'| \quad (16)$$

Weights $m_3$ and $m_4$ for the score values $S_a$ and $S_b$ based on the degrees of smiling of the detected faces A and B can be determined on the basis of a function $F_3$ with attribute information $A_a$ and $A_b$, such as sex and age, other than the degrees of smiling, of the detected faces A and B as arguments:

$$m_3 (\text{or } m_4) = F_3(A_a, A_b) \quad (17)$$

Here, the function $F_3$ can be realized by referring to the following table:

TABLE II

| $A_a$ | Adults | Male | 1.5 |
|---|---|---|---|
|  |  | Female | 1 |
|  | Children | Male | 2 |
|  |  | Female | 2 |

When a smile of a child is to be weighted heavily, the value of $m_3$ is increased only in the case of a child. When a photographer receives the tip that "males smile less frequently than females" using a statistical method and when the photographer takes this tip into consideration, if the detected face A is the face of a male, the value of the weight $m_3$ is increased to be greater than that of a female.

The degree-of-friendliness computing unit 206 performs the weighted computation on the obtained score values $S_i$ using the individual weight coefficients $m_i$, as in equation (12), and outputs the obtained evaluation value $H_{love}$ as an evaluation value to the image-capturing determining unit 204. The image-capturing determining unit 207 obtains an evaluation value H, using the following equation, on the basis of the evaluation value $H_{pattern}$ indicating the degree of match with a position pattern, an angle pattern, or a position/angle pattern, which is obtained from the pattern detecting unit 203, and the degree of friendliness $H_{love}$ output from the degree-of-friendliness computing unit 206:

$$H = \alpha H_{pattern} + \beta H_{love} \tag{18}$$

In the foregoing equation, $\alpha$ and $\beta$ are weighting coefficients. The weighting coefficients $\alpha$ and $\beta$ may be controlled in accordance with an image capturing mode, for example. A determination threshold for the evaluation value H may be controlled in accordance with, for example, $H_{pattern}$, $H_{love}$, attribute information parameters of detected faces, and image capturing mode (an image capturing mode in which the arrangement of photographic subjects is weighted heavily or an image capturing mode in which attributes of photographic subjects, such as degrees of smiling, are weighted heavily), a description of which is omitted.

If the evaluation value H exceeds a predetermined threshold, the image-capturing determining unit 207 determines whether to activate image capturing control such as determining of the shutter timing or setting of the self timer.

The present invention has been described in detail with reference to specific embodiments. However, it is clear that modifications or substitutions can be made to the embodiments by those skilled in the art without departing from the gist of the present invention.

In the present specification, the embodiments applied to a digital still camera have been mainly described. However, the gist of the present invention is not limited thereto. For example, the present invention can be similarly applied to various information devices, such as a digital video camera with a function of capturing a still image, a cellular phone or a personal digital assistant (PDA) with a digital camera function, a notebook computer, and a computer externally connected to a digital camera.

In short, the present invention has been disclosed by way of examples, and the disclosure in this specification should not be construed as limiting. The gist of the present invention should be determined on the basis of the section of claims.

The present application contains subject matter related to that disclosed in Japanese Priority Patent Application JP 2008-148841 filed in the Japan Patent Office on Jun. 6, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image capturing apparatus comprising:
    an image pickup unit configured to obtain an image;
    a face detecting unit configured to detect a face of a photographic subject included in the image;
    an attribute detecting unit configured to detect attribute information of the face;
    an evaluation unit configured to evaluate a degree of intimacy between a plurality of photographic subjects based on a plurality of items of attribute information detected by the attribute detecting unit from faces of the plurality of photographic subjects, wherein:
    the faces are detected by the face detecting unit,
    the degree of intimacy is a value that indicates a level of friendliness between the photographic subjects,
    the evaluation unit computes the value based on a comparison of the plurality of items of attribute information detected by the attribute detecting unit for the faces of the plurality of the photographic subjects, and
    the plurality of items of attribute information indicate one or more of: velocities of positions of the faces, angular velocities of positions of the faces, degrees of smiling of the faces, a distance between the faces, and inclinations of the faces; and
    a control unit configured to cause the image pickup unit to capture an image of the plurality of photographic subjects based on determining that the value computed by the evaluation unit exceeds a predetermined threshold value to determine whether to activate the image pickup unit by determining a shutter timing or a self timer for capturing the image.

2. The image capturing apparatus according to claim 1, further comprising:
    a computing unit configured to compute velocities at which positions of the faces of the plurality of photographic subjects change with time as the velocities of positions of the faces, or angular velocities at which angles of the faces of the plurality of photographic subjects change with time as the angular velocities of positions of the faces,
    wherein the evaluation unit evaluates the degree of intimacy based on the velocities or the angular velocities.

3. The image capturing apparatus according to claim 1, wherein the evaluation unit evaluates the degree of intimacy based on the degrees of smiling of the faces of the plurality of photographic subjects.

4. The image capturing apparatus according to claim 1, wherein the evaluation unit evaluates the degree of intimacy based on the distance between the faces of the plurality of photographic subjects and a difference between the inclinations of the faces of the plurality of photographic subjects.

5. The image capturing apparatus according to claim 1, wherein the control unit performs control on an animated cartoon to be displayed on a display unit, on the basis of the evaluation result obtained by the evaluation unit.

6. The image capturing apparatus according to claim 5, wherein:
    the evaluation unit evaluates the degree of intimacy based on the distance between the faces of the plurality of photographic subjects and the degrees of smiling of the faces, and
    the control unit displays, on the display unit, an animated cartoon for assisting the plurality of photographic subjects in performing an operation to shorten the distance between the plurality of photographic subjects or to enhance the degrees of smiling, in a case where the evaluation result obtained by the evaluation unit does not reach a predetermined state.

7. The image capturing apparatus according to claim 5, wherein the control unit displays, on the display unit, an animated cartoon that visually represents the evaluation result obtained by the evaluation unit, in a case where the evaluation result obtained by the evaluation unit reaches a predetermined state and the image pickup unit is controlled by the control unit to capture an image of the plurality of photographic subjects.

8. The image capturing apparatus according to claim 5, further comprising:
a human-relationship determining unit configured to determine a human relationship between the plurality of photographic subjects by performing statistical processing on the evaluation result obtained by the evaluation unit in a predetermined degree-of-intimacy determining period.

9. The image capturing apparatus according to claim 8, wherein the control unit adds a decoration to the image obtained by the image pickup unit, on the basis of the human relationship between the plurality of photographic subjects, which is determined by the human-relationship determining unit.

10. The image capturing apparatus according to claim 8, further comprising:
a recording unit configured to record the human relationship between the plurality of photographic subjects, which is determined by the human-relationship determining unit, as information to be added to the captured image.

11. An image capturing method comprising:
causing an image pickup unit to obtain an image;
detecting faces of photographic subjects included in the image;
detecting attribute information of the faces;
evaluating a degree of intimacy between a plurality of photographic subjects based on a plurality of items of attribute information detected from detected faces of the plurality of photographic subjects, wherein:
the degree of intimacy is a value that indicates a level of friendliness between the photographic subjects,
the evaluating includes computing the value based on a comparison of the plurality of items of attribute information detected from the detected faces of the plurality of the photographic subjects, and
the plurality of items of attribute information indicate one or more of: velocities of positions of the faces, angular velocities of positions of the faces, degrees of smiling of the faces, a distance between the faces, and inclinations of the faces; and
performing control to cause the image pickup unit to capture an image of the plurality of photographic subjects based on determining that the value computed in the evaluating exceeds a predetermined threshold value to determine whether to activate the image pickup unit by determining a shutter timing or a self timer for capturing the image.

12. A non-transitory computer-readable recording medium having a program recorded thereon, the program causing a computer to execute a process comprising:
causing an image pickup unit to obtain an image;
detecting faces of photographic subjects included in the image;
detecting attribute information of the faces;
evaluating a degree of intimacy between a plurality of photographic subjects based on a plurality of items of attribute information detected from detected faces of the plurality of photographic subjects, wherein:
the degree of intimacy is a value that indicates a level of friendliness between the photographic subjects,
the evaluating includes computing the value based on a comparison of the plurality of items of attribute information detected from the detected faces of the plurality of the photographic subjects, and
the plurality of items of attribute information indicate one or more of: velocities of positions of the faces, angular velocities of positions of the faces, degrees of smiling of the faces, a distance between the faces, and inclinations of the faces; and
performing control to cause the image pickup unit to capture an image of the plurality of photographic subjects based on determining that the value computed in the evaluating exceeds a predetermined threshold value to determine whether to activate the image pickup unit by determining a shutter timing or a self timer for capturing the image.

13. An image capturing apparatus comprising:
an image pickup unit configured to obtain an image;
a face detecting unit configured to detect faces of photographic subjects included in the image;
an evaluation unit configured to evaluate a correlation between a plurality of items of attribute information indicating positions or angles of faces of a plurality of photographic subjects, the faces being detected by the face detecting unit, wherein:
the evaluation unit evaluates the correlation by comparing the plurality of items of attribute information and computes a value based on the comparing, and
the plurality of items of attribute information indicate one or more of: velocities of positions of the faces, angular velocities of positions of the faces, a distance between the faces, and inclinations of the faces; and
a control unit configured to cause the image pickup unit to capture an image of the plurality of photographic subjects based on determining that the value computed by the evaluation unit exceeds a predetermined threshold value to determine whether to activate the image pickup unit by determining a shutter timing or a self timer for capturing the image.

14. The image capturing apparatus according to claim 13, wherein the evaluation unit evaluates the correlation, which is defined by the positions or the angles of the faces, by comparing the correlation with predetermined positions or angles.

15. The image capturing apparatus according to claim 14, wherein the predetermined positions or angles are positions or angles at which two or more detected faces are at the same height or three or more detected faces are substantially aligned on a straight line.

16. The image capturing apparatus according to claim 14, wherein the predetermined positions or angles are positions or angles of a polygon having positions of three or more detected faces of photographic subjects as vertices.

17. The image capturing apparatus according to claim 14, wherein the predetermined positions or angles are positions or angles at which two detected faces face inward or multiple detected faces face a certain direction.

18. An image capturing method comprising:
causing an image pickup unit to obtain an image;
detecting faces of photographic subjects included in the image;
evaluating a correlation between a plurality of items of attribute information indicating positions or angles of detected faces of a plurality of photographic subjects, wherein:
the evaluating includes evaluating the correlation by comparing the plurality of items of attribute information and computing a value based on the comparing, and
the plurality of items of attribute information indicate one or more of: velocities of positions of the faces, angular velocities of positions of the faces, a distance between the faces, and inclinations of the faces; and performing control to cause the image pickup unit to capture an image of the plurality of photographic subjects based on determining that the value computed by the evaluation unit exceeds a predetermined threshold value to determine whether to activate the image pickup unit by determining a shutter timing or a self timer for capturing the image.

19. A non-transitory computer-readable recording medium having a program recorded thereon, the program causing a computer to execute a process comprising:

causing an image pickup unit to obtain an image;

detecting faces of photographic subjects included in the image;

evaluating a correlation between a plurality of items of attribute information indicating positions or angles of detected faces of a plurality of photographic subjects, wherein:

the evaluating includes evaluating the correlation by comparing the plurality of items of attribute information and computing a value based on the comparing, and the plurality of items of attribute information indicate one or more of: velocities of positions of the faces, angular velocities of positions of the faces, a distance between the faces, and inclinations of the faces; and performing control to cause the image pickup unit to capture an image of the plurality of photographic subjects based on determining that the value computed by the evaluation unit exceeds a predetermined threshold value to determine whether to activate the image pickup unit by determining a shutter timing or a self timer for capturing the image.

* * * * *